US010029182B2

(12) United States Patent
LaMontagne

(10) Patent No.: US 10,029,182 B2
(45) Date of Patent: Jul. 24, 2018

(54) METHOD AND SYSTEM FOR RANDOMLY ALTERING INFORMATION AND CONTENT IN AN ONLINE GAME

(71) Applicant: Trivver, Inc., Huntington Beach, CA (US)

(72) Inventor: Joel LaMontagne, Huntington Beach, CA (US)

(73) Assignee: Trivver, Inc., Huntington Beach, CA (US)

(*) Notice: Subject to any disclaimer, the term of this patent is extended or adjusted under 35 U.S.C. 154(b) by 0 days.

(21) Appl. No.: 15/095,741

(22) Filed: Apr. 11, 2016

(65) Prior Publication Data

US 2016/0317931 A1 Nov. 3, 2016

Related U.S. Application Data

(63) Continuation of application No. 14/254,031, filed on Apr. 16, 2014, now Pat. No. 9,333,429, which is a
(Continued)

(51) Int. Cl.
*A63F 9/24* (2006.01)
*A63F 13/67* (2014.01)
(Continued)

(52) U.S. Cl.
CPC ............ *A63F 13/67* (2014.09); *A63F 13/335* (2014.09); *A63F 13/45* (2014.09); *A63F 13/537* (2014.09);
(Continued)

(58) Field of Classification Search
CPC ......... A63F 13/335; A63F 13/53; A63F 13/67
See application file for complete search history.

(56) References Cited

U.S. PATENT DOCUMENTS 6,210,170 B1 4/2001 Sorensen et al.
6,267,673 B1 7/2001 Miyamoto et al.
(Continued)

FOREIGN PATENT DOCUMENTS

JP 2003265863 A 9/2003
KR 20060063646 A 6/2006
(Continued)

OTHER PUBLICATIONS

Stanley et al., Real-Time Neuroevolution in The NERO Video Game, IEEE Transactions On Evolutionary Computation, vol. 9, No. 6, Dec. 2005, 16 pages.
(Continued)

*Primary Examiner* — Steve Rowland
(74) *Attorney, Agent, or Firm* — Chhabra Law Firm, PC

(57) ABSTRACT

A system and method for providing an objective to a user comprises a user registration unit, a build unit, a user interface unit, and an objective determination unit. The user registration unit is configured to receive a user request to operate the system. The build unit is configured to select a plurality of variable components for the system. The user interface unit is configured to receive user requests to interact with the variable components and to provide information to the user in response to the user requests. The objective determination unit is configured to determine whether the user has achieved the objective based at least in part on the user interactions.

17 Claims, 14 Drawing Sheets

Related U.S. Application Data continuation of application No. 12/269,813, filed on Nov. 12, 2008, now abandoned, which is a continuation-in-part of application No. 11/985,108, filed on Nov. 14, 2007, now abandoned.

(51) Int. Cl.

|  |  |
| --- | --- |
| *A63F 13/87* | (2014.01) |
| *A63F 13/335* | (2014.01) |
| *A63F 13/822* | (2014.01) |
| *A63F 13/45* | (2014.01) |
| *A63F 13/537* | (2014.01) |
| *A63F 13/79* | (2014.01) |

(52) U.S. Cl.
CPC ............ *A63F 13/79* (2014.09); *A63F 13/822* (2014.09); *A63F 13/87* (2014.09); *A63F 2300/554* (2013.01); *A63F 2300/5546* (2013.01); *A63F 2300/6018* (2013.01); *A63F 2300/63* (2013.01); *A63F 2300/807* (2013.01)

(56) References Cited

U.S. PATENT DOCUMENTS

| | | | |
|---|---|---|---|
| 6,701,343 | B1 | 3/2004 | Kenyon |
| 7,155,158 | B1 | 12/2006 | Iuppa et al. |
| 7,174,506 | B1 | 2/2007 | Dunsmoir et al. |
| 7,546,534 | B1 | 6/2009 | Andrews et al. |
| 7,668,913 | B1 | 2/2010 | Underwood et al. |
| 2001/0024974 | A1 | 9/2001 | Cohen |
| 2002/0039920 | A1 | 4/2002 | Bryant |
| 2002/0052881 | A1 | 5/2002 | Player |
| 2003/0032480 | A1 | 2/2003 | Keith |
| 2003/0050986 | A1 | 3/2003 | Matthews et al. |
| 2003/0054884 | A1 | 3/2003 | Stern |
| 2003/0107178 | A1 | 6/2003 | Weston |
| 2003/0177187 | A1 | 9/2003 | Levine et al. |
| 2004/0003259 | A1 | 1/2004 | Chang |
| 2004/0111484 | A1 | 6/2004 | Young et al. |
| 2004/0148221 | A1* | 7/2004 | Chu ..................... A63F 13/12 705/14.51 |
| 2005/0171998 | A1 | 8/2005 | Oh |
| 2005/0245303 | A1 | 11/2005 | Graepel et al. |
| 2005/0250580 | A1 | 11/2005 | Bird |
| 2006/0014585 | A1 | 1/2006 | Neogi |
| 2006/0046854 | A1 | 3/2006 | Arevalo Baeza et al. |
| 2006/0121987 | A1 | 6/2006 | Bortnik et al. |
| 2006/0121991 | A1 | 6/2006 | Borinik et al. |
| 2006/0252533 | A1 | 11/2006 | Sakaguchi et al. |
| 2006/0281508 | A1 | 12/2006 | Carney et al. |
| 2006/0287106 | A1 | 12/2006 | Jensen |
| 2007/0038717 | A1 | 2/2007 | Burkholder et al. |
| 2007/0078706 | A1* | 4/2007 | Datta .................... G06Q 30/02 705/14.5 |
| 2007/0126749 | A1 | 6/2007 | Tzruya et al. |
| 2007/0173327 | A1 | 7/2007 | Kilgore et al. |
| 2007/0178968 | A1 | 8/2007 | Cote-Charpentier et al. |
| 2007/0186007 | A1 | 8/2007 | Field et al. |
| 2007/0207844 | A1 | 9/2007 | Pottinger et al. |
| 2007/0293322 | A1 | 12/2007 | Horowitz et al. |
| 2008/0039171 | A1 | 2/2008 | Slomiany et al. |
| 2008/0108432 | A1 | 5/2008 | Cohen et al. |
| 2008/0200252 | A1 | 8/2008 | Borgs et al. |
| 2008/0227553 | A1 | 9/2008 | Leifenberg et al. |

FOREIGN PATENT DOCUMENTS

| | | |
|---|---|---|
| KR | 20060105905 A | 10/2006 |
| WO | WO-2009064786 A1 | 5/2009 |

OTHER PUBLICATIONS

Soni et al., Bots Trained To Play Like A Human Are More Fun, 2008 International Joint Conference on Neural Networks (IJCNN 2008), 7 pages.

Parker et al., The Evolution of Multi-Layer Neural Networks For The Control of Xpilot Agents, Computer Sci., Indiana Univ., Bloomington, IN, This paper appears in: Computational Intelligence and Games, 2007, CIG 2007, IEEE Symposium, Publication Date: Apr. 1-5, 2007, 6 pages.

Craighead, Distributed, Game-Based, Intelligent Tutoring Systems—The Next Step in Computer Based Training?, This paper appears in: Collaborative Technologies and Systems, 2008, CTS 2008, International Symposium, Publication Date: May 19-23, 2008, 10 pages.

Cavex—Game in Progress, printed at http://runevision.com/multimedia/caver/ on Nov. 11, 2008, 9 pages.

Office Action from Chinese Patent Application No. 2008801138492 dated Nov. 9, 2011 (in English language), 6 pages.

International Preliminary Report on Patentability from British Patent Application No. GB008502.5 dated May 21, 2010, 2 pages.

Hypothetical Software launches Sleuth: Shades of Mystery to User Acclaim, http://www.hypoware.com/press/sleuth_shades_of_mystery_launches.html, Mar. 2006, 2 pages.

Sleuth: Shades of Mystery, http://noi r. playseuth .com/map/cityhall/updates/shades of_mystery.spy, Jul. 2007, 3 pages.

Writer's Workshop: A Sleuth Mystery Editor, http://www.hypoware.com/press/sleuth_writers_workshop.html, Mar. 2007, 1 page.

Sleuth: Detective Apartments Expansion, http://www.hypoware.com/press/sleuth_detective_apartments.html, Dec. 2006, 1 page.

Sleuth: Shadow of the Villains expansion announced, http://www.hypoware.com/press/sleuth_shadow_of_villains.html, Jul. 2006, 1 page.

Mystery Publisher Partnership Program, http://www.hypoware.com/publishers.html. Jul. 2006, 1 page.

Sleuth Community News, http://www.hypoware.com/press/sleuth_community_200606.html, Jun. 2006, 2 pages.

The Doomsayer Trilogy, http://www.hypoware.com/press/doomsayer_trilogy.html, May 2006, 2 pages.

Introducing Sleuth Footwear, http://www.hypoware.com/press/introducing_sleuth_footwear.html, Nov. 2005, 1 page.

Featured Mystery News, http://www.hypoware.com/press/featured_mystery_news_200508.html. Aug. 2005, 1 page.

Featured Mystery News, http://www.hypoware.com/press/featured_mystery_news_200507.html. Jul. 2005, 1 page.

Sleuth: Cities of Mystery Expansion Launched, http://www.hypoware.com/press/sleuth_city_of_mysteries.html, Feb. 2005, 2 pages.

Office Action for U.S. Appl. No. 11/985,108, dated Jan. 31, 2011, 8 pages.

Welcome to Sleuth: Shades of Mystery, http://shades.playsleuth.com, Apr. 26, 2010, 4 pages.

International Search Report and Written Opinion for International Application No. PCT/US2008/083239, dated Mar. 25, 2009, 7 Pages.

\* cited by examiner

USER DATA FILE

| | |
|---|---|
| LOG-ON CODE | 900 |
| USER PERSONAL INFORMATION | 902 |
| SERIAL NUMBER OF ITEM 1 | 904 |
| SERIAL NUMBER OF ITEM 2 | 906 |
| SERIAL NUMBER OF ITEM n | 908 |
| TIME OF ITEM 1 | 910 |
| TIME OF ITEM 2 | 912 |
| TIME OF ITEM n | 914 |
| SUM OF TIMES | 916 |
| OTHER USER INTERACTIONS | 918 |
| UPLOADED USER IMAGE | 920 |
| UPLOADED VIDEO | 922 |
| OTHER UPLOADED MEDIA | 924 |
| EMAIL REQUESTS | 926 |
| EMAIL RESPONSES | 928 |
| OTHER DATA | 930 |

FIG. 9

LOG-ON AND GAME CODE PROCESS

REGISTRATION
User fills in their name, mailing address, phone number, email address, etc.

LOG-ON CODE
The system selects specific alphanumeric positions ("$n$") in the REGISTRATION to create a LOG-ON CODE. See FIG. 12

GAME BUILD CODE
The system designs unique web pages by accessing the system's Item Data Files. Using the User's Log-On Code the system assigns a unique alphanumeric Game Code.

GAME DATA FILE
Accessing the User's Log-On Code and Game Code the system creates a Game Data File. Codes and serial number needed to accurately complete the challenge are stored in the Game Data File.

USER'S DATA FILE
Accessing the User's Log-On Code and the Game Build Code the system creates a User's Data File. Every action the user has with the web site/game will be recorded into the User's Data File.

END GAME
The system access the User's Data File and the Game Data File, the system checks these Files to make sure the user has conducted a thorough investigation and that user's conclusion are warranted.

FIG. 11

User's Log-On Code
Example

User's Registration Information:
1. Name — John Smith
2. Street Address — 123 Main Street
3. City & State — Hope Town, Florida
4. Zip & Country — 12345
5. Credit Card Number — xxxx-xxxx-xxxx-1234
6. Email Address — JDL115@XYZ.com
7. Phone Number — 321-555-6602

Formula: $f_n = (x + z)$ n = the number or letter position    x = the A/N position    z = predetermined numbers

A=0; B=2; C=3; D=4; E=5; F=6; G=7; ...; Z=36

Zip
12345

$f_1 = (x + 3) = (1 + 3) = 4 = D$
$f_2 = (x + 2) = (2 + 2) = 4 = D$
$f_3 = (x + 5) = (3 + 5) = 8 = H$
$f_4 = (x + 1) = (4 + 1) = 5 = E$
$f_5 = (x + 0) = (5 + 0) = 5 = E$

Phone #
321-555-6602

$f_6 = (x + 2) = (3 + 2) = 5 = E$
$f_7 = (x + 6) = (2 + 6) = 4 = H$
$f_8 = (x + 9) = (1 + 9) = 10 = J$
$f_9 = (x + 2) = (5 + 2) = 7 = G$
$f_{10} = (x + 2) = (5 + 2) = 7 = G$
$f_{11} = (x + 1) = (5 + 1) = 6 = F$
$f_{12} = (x + 4) = (6 + 4) = 10 = J$
$f_{13} = (x + 3) = (6 + 3) = 9 = I$
$f_{14} = (x + 1) = (0 + 1) = 1 = A$
$f_{15} = (x + 0) = (2 + 0) = 2 = B$

User's Log-On Code = DDHEE-EHJGGFJIAB

FIG. 12

ITEM CODE ENCRYPTION

Using the first letter in each Item data Bank and the number of choices.
For Example (FIG 7):

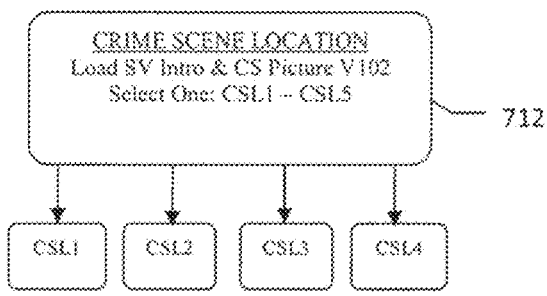

The system will encrypt CSL1-CSL5
Formula: $f_n = (x + z)$ n = the number or letter position   x = the A/N position   z = predetermined numbers

A=0; B=2; C=3; D=4; E=5; F=6; G=7; ...; Z=36

CSL1

$f_1 = (x + 1) = (C + 1) = 4 = D$
$f_2 = (x + 2) = (S + 2) = 30 = U$
$f_3 = (x + 4) = (L + 4) = 11 = K$
$f_4 = (x + 3) = (I + 3) = 4 = D$

The item code for Crime Scene Location 1 (CSL1) = DUKD

FIG. 13

METHOD AND SYSTEM FOR RANDOMLY ALTERING INFORMATION AND CONTENT IN AN ONLINE GAME

CROSS-REFERENCE TO RELATED PATENT APPLICATIONS

This application is a continuation of U.S. Pat. No. 9,333,429, filed on Apr. 16, 2014, which is a continuation, and claims the benefit of, application Ser. No. 12/269,813 filed on Nov. 12, 2008, which is further a continuation-in-part of application Ser. No. 11/1985,108, filed on Nov. 14, 2007. The contents of the above identified applications are incorporated herein by reference in their entirety.

BACKGROUND

The present application relates generally to systems and methods for providing objectives to a user.

Objectives are provided to users in different ways, whether in the form of electronic games, standardized tests, military training, or otherwise. For example, electronic card games can be played which are operable on a computer or over the Internet. As another example, computer simulations are used for military training, flight training etc.

SUMMARY

According to one embodiment, a system for providing an objective to a user comprises a user registration unit, a build unit, a user interface unit, and an objective determination unit. The user registration unit is configured to receive a user request to operate the system. The build unit is configured to select a plurality of variable components for the system. The user interface unit is configured to receive user requests to interact with the variable components and to provide information to the user in response to the user requests. The objective determination unit is configured to determine whether the user has achieved the objective based at least in part on the user interactions.

According to another exemplary embodiment, a computer program stored on a computer-readable medium for operation by a processor or for transmission to another computer-readable medium for storage thereon for operation by another processor is provided. The computer program is configured to cause the processor operating the program to provide functions comprising receiving a user request to operate the computer program, wherein the computer program is configured to provide an objective to the user; selecting plurality of variable components for the computer program; receiving user requests to interact with the variable components; providing information to the user in response to the user requests; and determining whether the user has achieved the objective.

According to another exemplary embodiment, a device for providing an objective to a user comprises a processing circuit and a memory. The processing circuit is configured to provide a system with which a user may interact. The memory is configured to store a plurality of time periods associated with different user interactions. The processing circuit is configured to receive user requests to interact with the system, retrieve from the memory time periods associated with the received user interactions, sum the retrieved time periods, and determine whether the user has achieved the objective based at least in part on the summed time periods.

BRIEF DESCRIPTION OF THE DRAWINGS

FIG. 9 is a diagram showing a user data file, according to an exemplary embodiment;

FIG. 11 is a flow diagram of a log-on code and game code process, according to an exemplary embodiment;

FIG. 12 is a diagram illustrating the generation of a log-on code, according to an exemplary embodiment;

FIG. 13 is a diagram illustrating the generation of an item code encryption, according to an exemplary embodiment.

DETAILED DESCRIPTION OF EXEMPLARY EMBODIMENTS

One or more embodiments may provide a challenge, such as an on-line game of skill, which may require the user to apply problem solving, deductive reasoning, cognitive thinking, or other skills to meet the challenge.

One or more embodiments may use variable components (e.g., by shuffling, randomization, or other selection processes) along with fixed components to allow users to interact with a same basic game multiple times without having the same experience each time. One or more embodiments may create an even playing field for all users, and may prevent a frequent user from gaining a significant advantage over a first-time or single-use user.

One or more embodiments may incorporate randomized information and content into web pages to create unique website experiences.

One or more embodiments may store time periods associated with user interactions which do not necessarily relate to real time associated with the user interaction, which may overcome differences in the difficulty of achieving the objective associated with different computer or network devices (e.g., dial-up vs. cable modem speeds, processor speeds, etc.).

One or more embodiments may discourage guessing at a solution to the game by logging user interactions with the game to support that the user accessed the proper web pages and performed tasks required for those websites to validate the user's conclusion.

One or more embodiments may ensure that a user has conducted a thorough investigation before determining that the user has achieved the objective, which may frustrate efforts to cheat or share information with other user.

One or more embodiments may incorporate pre-recorded video, branded items, a digital photograph of the user, or other media sources as part of the variable and/or fixed data to provide a more realistic user experience, and to provide advertising value.

One or more embodiments may be used as part of a reward program for a product or service company, wherein a reward, which may range from a coupon or discount to a sweepstakes prize, may be awarded based on the user accomplishing an objective of the system. The objective may be for the user to obtain the reward or to meet one or more criterion for obtaining the reward.

Figure 1:
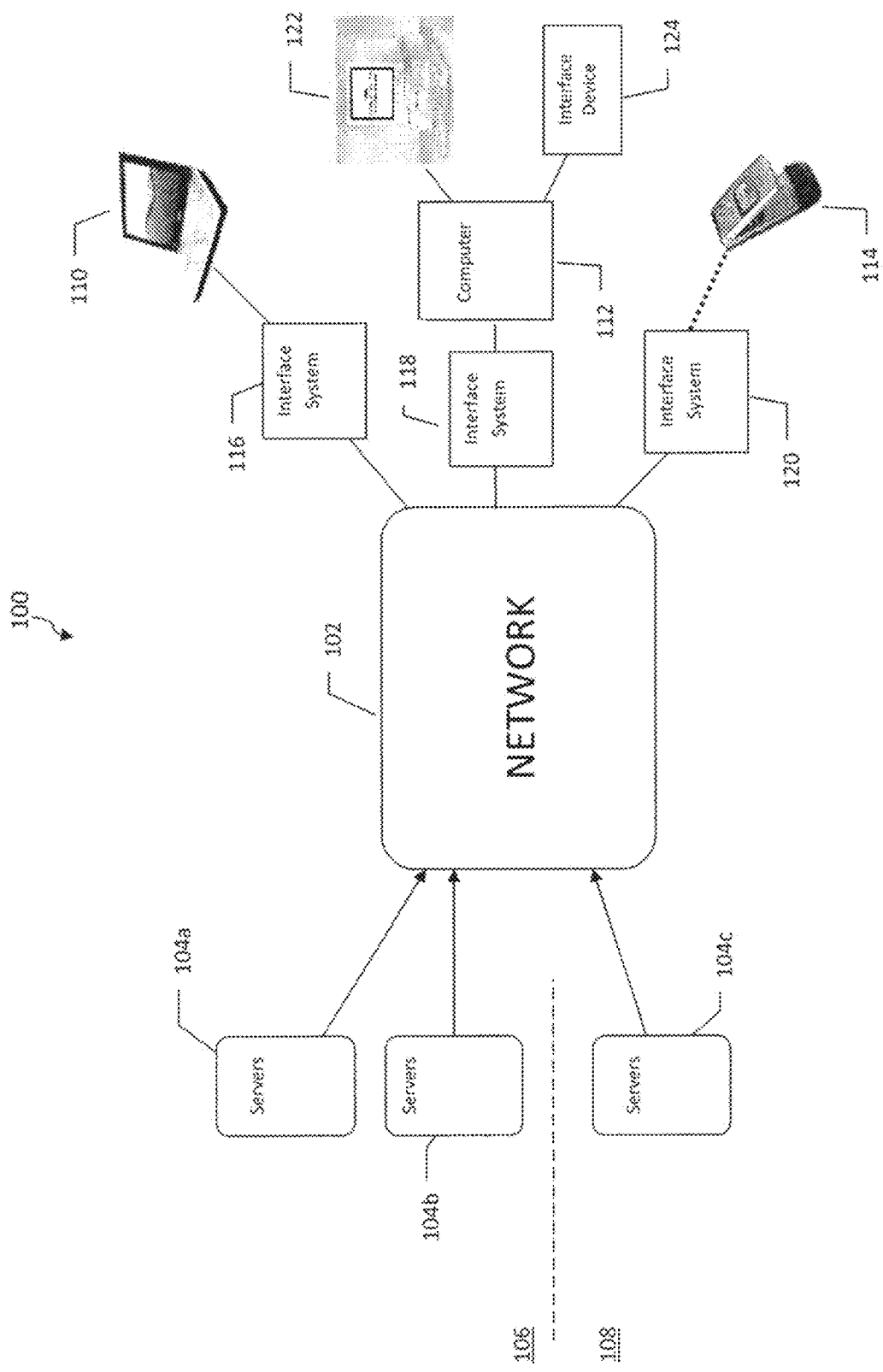
FIG. 1 is a block diagram of a system for providing an objective to a user, according to an exemplary embodiment.

Referring to FIG. 1, a system 100 for providing an objective to a user will be described, according to an exemplary embodiment. The system 100 of FIG. 1 illustrates an embodiment in which system 100 operates over a network 102, such as a local-area network or wide-area network, such as the Internet or other network using packet switching and/or an Internet Protocol Suite, e.g., TCP/IP (transmission control protocol/internet protocol) communication protocol suite. In alternative embodiments, system 100 may operate locally on a personal computer or handheld computer without using a wide area network for communications, but rather using local peripheral devices such as a keyboard, mouse, and display. In further alternatives, system 100 may operate on an arcade game console, or other dedicated entertainment machine which may or may not communicate with a network.

In the embodiment shown in FIG. 1, system 100 is operable on one or more server computers 104a, 104b, 104c (hereinafter collectively or individually referred to as server 104), which may operate at a single physical location 106 or at different physical locations 106, 108, which may be different buildings, states, or countries. Servers 104 are configured to communicate via network 102 with one or more client computers 110, 112, or 114, shown here in three exemplary embodiments in which computer 110 comprises a laptop computer, computer 112 comprises a desktop computer, and computer 114 comprises a handheld computer. Each of computers 110, 112 and 114 comprise a corresponding network interface system or service 116, 118, and 120, respectively, which represent different systems and methods for communicating with computers 104 via network 102. For example, laptop 110 may use a cable modem, digital subscriber line (DSL), or other high-speed device for Internet access, desktop computer 112 may use a telephone dial-up or other lower-speed device for Internet access, and mobile device 114 may use a wireless device (e.g., cellular radiotelephone, Wi-Fi access point, etc.) for Internet access. These or other computing devices may each use one or more network interface systems or services 116, 118 or 120, or other network interface systems or services. In this embodiment, any of the processing steps described herein may be operable on one or more of computers 104a-104c to send data to and receive data from computers 110, 112 and/or 114 to interact with users operating computers 110, 112, and/or 114. In other embodiments, one or more of the processing steps described herein may operate on computers 110, 112, and/or 114 (e.g., in a case where the processes are run locally, such as in the case of a thin client), or on other computing devices not shown. Display 122 may be any type of display, such as cathode ray tube, liquid crystal display, projection screen, etc. User interface device 124 may comprise one or more user interface devices, such as a mouse, trackball, keyboard, speaker output, microphone input to receive voice commands, etc.

Figure 2:
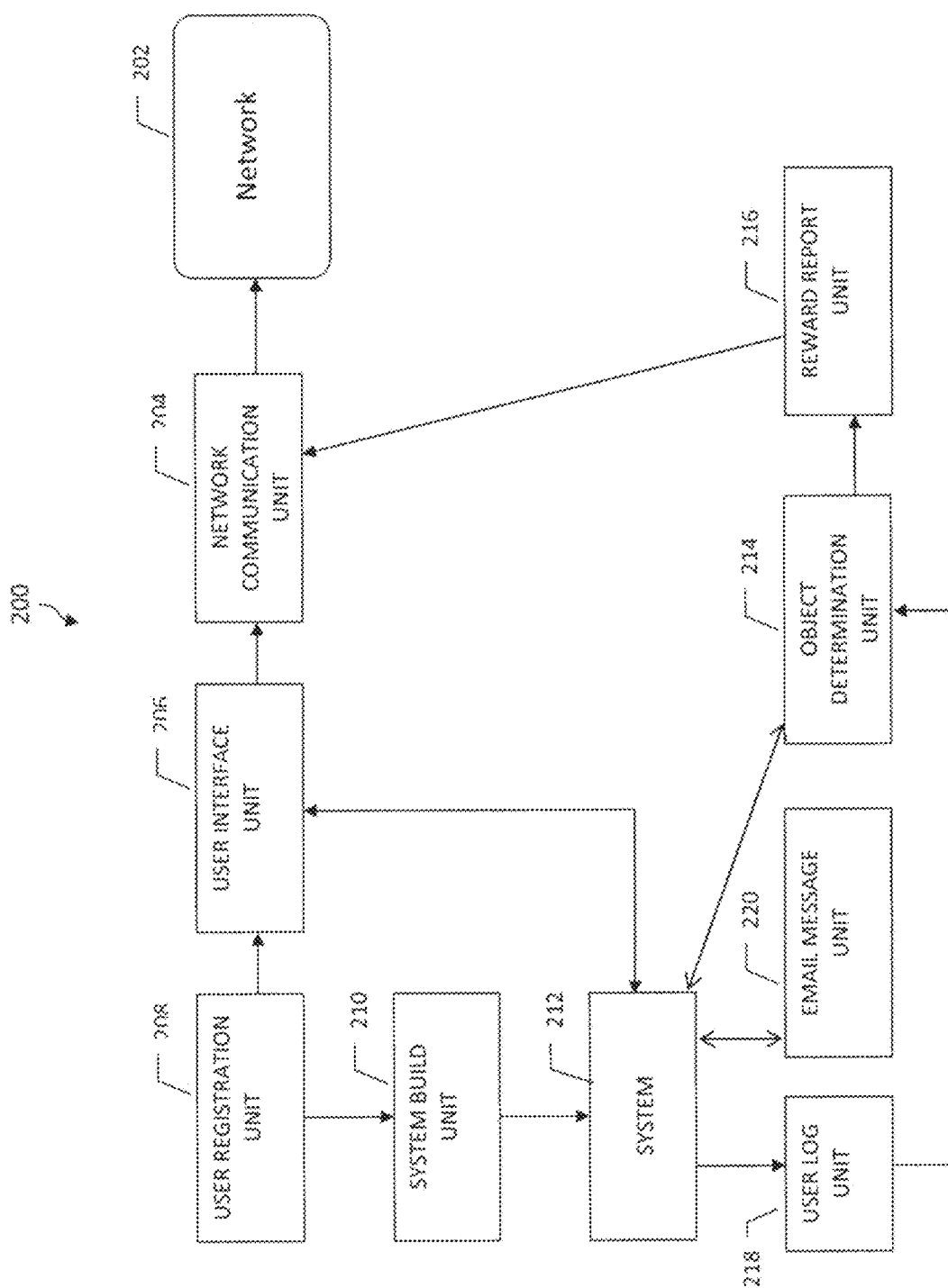
FIG. 2 is a block diagram of a system for providing an objective to a user, according to another exemplary embodiment.

Referring now to FIG. 2, a system 200 for providing an objective to a user is shown according to another exemplary embodiment. System 200 comprises units, modules, circuits or circuit portions, mechanisms, or devices, as part of a machine or apparatus, each of which performs one or more of the processes or functions described herein. Each such unit may comprise a computer program portion, code, software, or other computer-readable data operating on suitable electronic circuitry, which may be general-purpose or specific-purpose circuitry and may include one more microprocessors, microcontrollers, application-specific integrated circuitry, programmable logic, or other analog and/or digital circuit elements. The code may be stored in or on a computer-readable medium, such as a memory (e.g., compact disk, digital versatile disk, computer memory, such as read-only memory, programmable read-only memory, flash memory, magnetic drive, hard drive, tape drive, firmware, or any other memory) which memory may be accessed by or configured to be read or operated by a processor to operate the code or be configured to transfer the code (e.g., via electronic transmission, wireless transmission, or physical transmission, such as via a retail store or in a package delivered through the mail) to another computer-readable medium (e.g., a memory) for operation by another processor (e.g., a processor associated with the memory or otherwise configured to read the memory). In any case, the computer program is configured to cause the processor operating the program to provide one or more of the functions, processes, or steps described herein. The organization of the units as set forth in FIG. 2 is exemplary and in practice the functions may be organized in modules, objects or routines different than as set forth in FIG. 2, or the units may share certain functions described herein. The code may be programmed in any of a variety of programming languages such as FORTRAN, C, C++C#, Java, etc., and may comprise machine code, source code, object code, or other types of code.

In the embodiment of FIG. 2, the various units are configured to communicate via network 202 with a user, as described in FIG. 1. A network communication unit 204 is configured to format incoming and outgoing data signals in a manner (e.g., protocol, etc.) suitable for communication on the network and for communication with the units shown in FIG. 2. A user interface unit 206 is configured to process communications to and from the user, any of which may be user interactions. A user registration unit 208 is configured to receive a user request to operate the system. In response to the request, the system proceeds with a registration process as will be described in greater detail below. The request to operate the system may be received from a user over the Internet in response to a user accessing a web page provided by network communication unit 204 on network 202.

A system build unit 210 is configured in response to the user registration unit 208 to generate a build, iteration, version, or instance of the system (e.g., computer program, computer system, software, algorithm, machine, apparatus, etc.) with which the user may interact. Build unit 210 may be configured to select a plurality of variable components for the system which may be different or differently-placed in different builds of the system. The variable components may in one exemplary embodiment by selected pseudorandomly for at least a portion of the builds generated by system build unit 210. A component may comprise any data, such as data forming a portion of the system, which may comprise a data file having a plurality of data elements. Build unit 210 may further be configured to select a plurality of fixed components for the system which are the same or similarly-arranged in different builds of the system. For example, in a case where the system to be built is a murder mystery game, fixed components may represent actual or fabricated physical or tangible landscapes, buildings, rooms within buildings, and roads, and variable components may comprise props, evidence, and actors for the murder mystery game. In other examples, the system may comprise fixed and variable components for a treasure hunt, art theft, military training, test, etc. A build of system 212 is generated by system build unit 210.

User interface unit 206 is configured to receive user requests to interact with the variable components and/or fixed components and to forward them to the build system 212. The build system 212 is configured to provide information to the user in response to the user requests. For example, the build system 212 may receive a request to dust a prop for fingerprints and the built system 212 may, in response, provide fingerprint data to the user for further analysis as the user attempts to solve the murder mystery. Build system 212 may further comprise a table of time periods stored in memory which are associated with different user interactions, though not necessarily being commensurate with a real time used by the user to perform the user interactions. Certain user interactions may result in a time period being charged to the user, the charged time periods being stored in a user log unit 218 as the system progresses. Data regarding user interactions with the system represent physical or tangible characteristics of the user, as the user's problem solving skills, deduction reasoning, physical input to the system, etc.

An objective determination unit 214 is configured to determine whether the user has achieved the objective based at least in part on the user interactions. For example, the objective may be to solve the murder mystery and unit 214 may be configured to prompt the user for a solution to the mystery and determine whether the user's proposed solution is correct. Each build of the system has a predetermined or defined outcome in which user's skills of problem solving, deductive reasoning, cognitive thinking, or other skills must be used to accurately and properly solve challenge or meet one or more objectives. Examples for a murder mystery game include using investigative skills, processing a crime scene, interviewing suspects, processing clues, forensic or ballistic analysis, understanding motives, distinguishing truth from red herrings, etc. A reward reporting unit 216 may be configured to report any of a variety of data used by system 200, such as whether the user proposed solution is correct, user profile information, user incorrect guesses, etc. to an entity responsible for operating the system 200 as part of a reward or sweepstakes program. The entity can then decide whether to provide a reward to the user based on the data reported by unit 216.

A user log unit 218 may be configured to log user interactions with the variable or fixed components. For example, evidence collected, crime scenes investigated, and other interactions may be logged. Objective determination unit 214 may be configured to determine whether the objection has been accomplished based at least in part on data logged by user log unit 218.

An e-mail message unit 220 may be configured to receive electronic mail messages from the user and to send electronic mail messages to the user. For example, a user may send an e-mail message requesting a fingerprint analysis and may receive in return an e-mail message with the results of the fingerprint analysis. This interaction too, may be logged in user log unit 218 and may be used by objective determination unit 214 to determine whether the objective has been solved.

Figure 3:
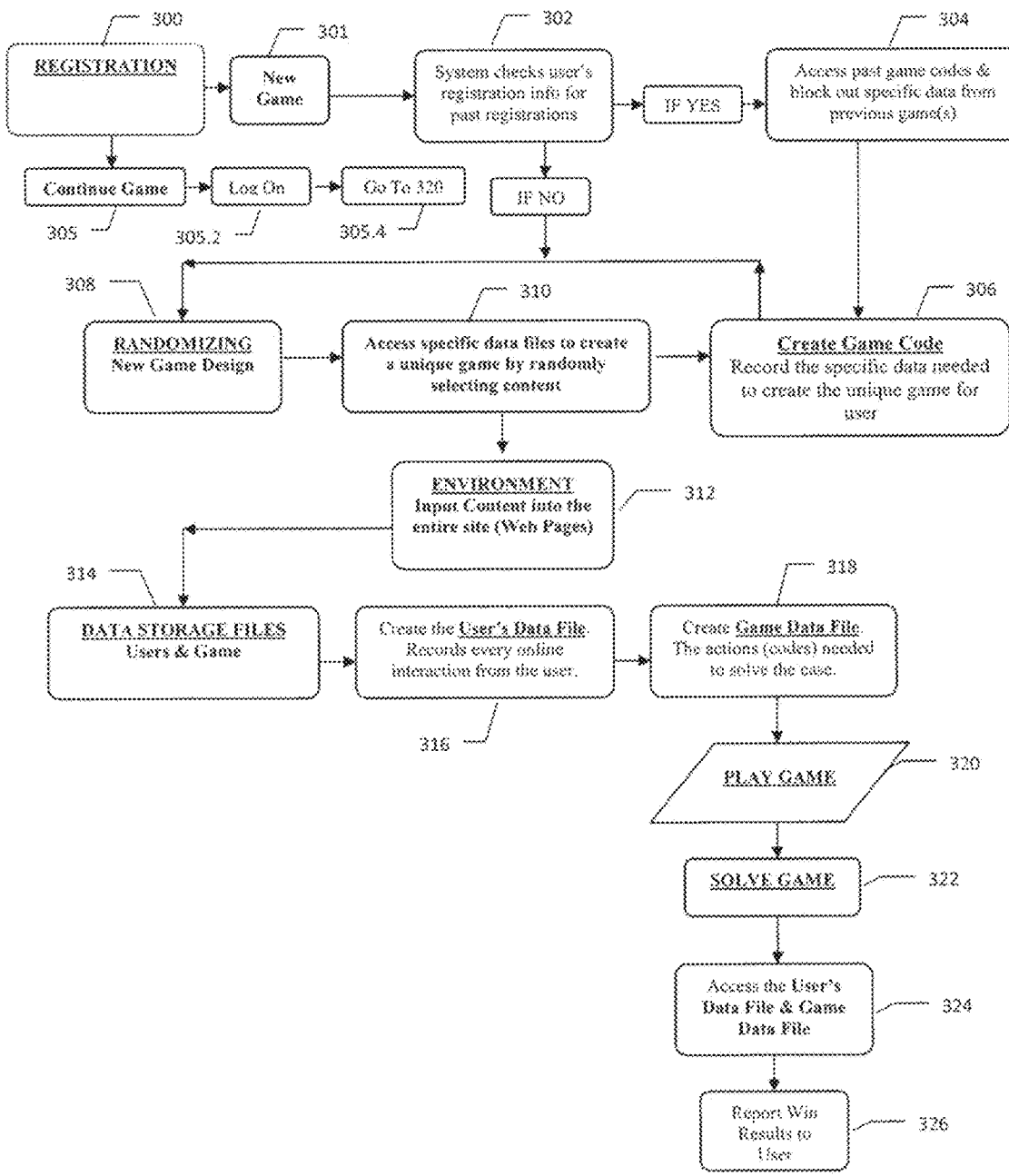
FIG. 3 is a flow diagram of a system and method for providing an objective to a user, according to an exemplary embodiment.

Referring now to FIG. 3, a flow diagram of a system and method for providing an objective to a user will be described, according to an exemplary embodiment. The steps of FIG. 3 may be operable on the structure shown in FIG. 1 or FIG. 2 above, or other structure. FIG. 3 illustrates an algorithm for generating the system and interacting with the user during a user session, such as a gaming session. The system may comprise computer software configured to generate websites, web pages, or other screens or environments which receive and process user interactions and to generally carry out the challenge for the user. If the user already has a log-on code and game code from a previously-created game that the user wishes to continue playing (step 305), the system may be configured to receive the codes (and/or any username, password, etc.) (step 305.2) and proceed (step 305.4) to play the game at step 320 (or to create or recreate portions or all of the game if the game was not previously stored upon log-out, by referencing the user data file and/or game data file, to be described below). However, if a user wishes to generate a new iteration or build of the game, the system is configured at step 300 to begin a registration process.

At step 300, the user request is received to begin a new interaction with the system, which in this embodiment comprises a game, but in alternative embodiments may comprise a military training program, an educational program, a test, training, other games of skill, or other challenges in which one or more objectives is presented to a user for completion. In response to the user request to generate a new iteration or build of the system at step 301, if the user has not previously registered, the user's personal information is received, for example, by having the user fill out a form displayed on a web page, which may receive one or more of a user's name, date of birth, address, phone number, email address, credit card or other financial account information, last four digits of the user's social security number, etc. A first code associated with or identifying the user, such as a serial number, is generated by the system and stored in a user's master data bank or user's data file. This first code may be a log-on code, which is any code the system may be configured to receive to allow the user to log on to or access a portion of the system. The system may be configured to create the serial number based on one or more components of the user's personal information. For example, the system may be configured to select and encrypt some or all of the user's registration data using any type of encryption or scrambling process, such as, a Caesar cipher, a hash function, a process using a crypt key, etc. At step 302, the system is configured to determine whether this is a first request to generate an iteration of this system, for example, by comparing one or more components of the user registration data or log-on code to past registration data or serial numbers for this and/or other users. If the user has not previously generated a game, the process proceeds to steps 308, 310 and 306 to begin generating a build of the system and a corresponding game code.

If the user has previously generated a game, the process proceeds to step 304 to access past game codes used in previous iterations or builds of the game and to block out predetermined data from the previous games from being used again in this build of the game. In this way, the system prevents the user from getting the same suspects, victim, and/or evidence as in a previous build of the game. As will be described in greater detail herein, once the system builds a web site or online game, or after variable components are selected (e.g., at steps 308 and 310), the system may record all of the vital or necessary information (e.g., codes) needed to accurately solve the challenge into the user's data file (and/or in the game data file), as shown at step 306. At the time of each user registration, the system may be configured to access the user's data file and, based on one or more of the codes stored therein, build a new iteration or build of the game by changing or omitting one or more of the codes therein to prevent the user from getting a same or similar iteration of the game. Also at step 306, a game code is generated for a new game, which may be a pseudorandom number, or may be based on the log-on code, or any other data associated with the game being built or which has been partially or completely built at the time of generation of the game code. Steps 304, 306, 308 and 310 may occur in any order.

At step 308 variable components of the game are selected in a pseudorandom process. Based on outputs from a pseudorandom number generator, specific data files are accessed at step 310 to provide at least some level of uniqueness, randomness, or variability to this iteration or build of the game as compared to other iterations of the game provided for this user previously or for other users. At step 306, once the system selects variable components (or builds a web site or online game), the system records codes (e.g., necessary information) needed to accurately solve the challenge. At step 312, the variable components are added to fixed components, such as an environment, room in a building, geographic location, etc. to form portions of the program, which may be shown as web pages and stored at step 314. Fixed components may be data which are common or a plurality or all iterations or builds of a particular system version (e.g., a particular murder mystery game). Fixed and variable components may be stored in one or more content databases for selective retrieval by the system to generate builds.

Thus, a method and system for randomly altering information and content within web pages to create a new, unique, or variable website for an online game is provided. Any variability algorithm may be used, such as a pseudorandom number generator having any number of characteristics, selection of the variable components from a list stored in memory in sequence, a random number generator which senses a randomizing event, such as the time period between receiving user key presses or other interactions, or any other variable algorithm which provides at least some variability in the games created for different users or different iterations of the game for a single user. According to one embodiment, different or unique web pages for a specific web site operating a game or other program are defined, created, or built by accessing pre-designed data files (e.g., designed before the user registration at step 300, before the system is launched on the Internet, etc.) and inputting the accessed data files into individual web pages, wherein the web pages provide a same or similar basic design or environment in the form of fixed components, but the variable components may be different between different iterations or builds of the game. In this manner, different unique scenarios may be created for different users by altering the information or content between the different builds of the game. One or more embodiments may provide the advantage of avoiding problems that exist with current websites that are linear in design, in which a specific procedure can be memorized to achieve a single outcome. The system may be configured to provide a different or unique identification code (e.g., alphabetic, numeric, alphanumeric, etc.) or system for each web page, task performed, e-mail correspondence, item within a web page, information, movement, procedure, or interaction. One or more of the identification codes may be created using a secret encrypted algorithm or formula, such as any of the encryption or scrambling methods described herein, or other methods such as pseudorandom number generation, sequential numbers, etc.

At step 306, a code is created that is associated with the iteration or build of the game, called the game code. The code may further be associated with specific data needed to create or recreate the build of the game for the user, such as codes representing the variable data selected for this build of the game. The code may be a game code which may be provided to the user to be entered into a web page the next time a user registers or logs on to participate in the game, so that the build of the game can be retrieved for the user to continue interacting with. The log-on code and/or game code may be emailed to the registered user or participant using an email address provided by the user, or a new e-mail address generated for the user within an e-mail component internal to the system. The user, upon registration at step 300, may also choose or be assigned a username and/or password. A username and/or the unique log-on code may be entered by the user during an initiation or registration process at step 300. The log-on code or access code may alternatively be used along with an email address or other identifier of the user. Multiple registrations from a single user are allowed, whereby a single user may have multiple log-on codes or access codes for the different builds of the website or game, for example, where the log-on codes are based at least in part on data from a build of the game.

The log-on code or access code associated with the build of the program may be generated by an algorithm configured to provide an alpha numeric, alphabetical, numerical, or other access code. An exemplary method of generating a log-on code is described with reference to the embodiment of FIGS. 11-12.

Referring again to step 312, the fixed components and variable components used by the system to generate a build of the system may be generated, designed, or created by web and/or game designers who create the fixed components as a template or base design and the variable contents as the interchangeable web pages for a single web site or iteration of the game. In one embodiment, not all web pages or fixed components or variable components may necessarily be used in designing the build. The design of the fixed and/or variable components can be animated, created from real or fictional characters, created from real or fictional physical locations (i.e., from a movie or television show), can comprised components from other existing games, can comprise military components, can comprise any data associated with digital versatile disks (DVDs), television shows, movies, any internet content, such as video clips from a video sharing site such as YouTube™, etc. The variable components may comprise different scenarios, endings, evidence, information, etc.

Referring now to step 316, a user data file is generated, as shown in exemplary form in FIG. 9. The system may be configured to begin the user's data file with information identifying the user, such as any of the user's personal information received during the registration step 300, the log-on or access code associated with the user, or other information. As the game is played (step 320), the system is configured to record certain interactions the user has with the game in the user data file. The system may be configured to record the user's progress through an individual game, the time required to execute certain interactions, movements of the user within the environment of the game, information requested by the user from the game, email correspondence to or from the game, etc.

At step 318, the system is configured to create a game data file which is configured to store certain actions, codes, or other data needed to solve the case or achieve the objective. Once the system has generated the build of the program (e.g., unique website for an online game), the system is configured to calculate how many procedures, steps and/or the time (e.g., real time or game time) required to correctly or accurately solve the game generated. The system is configured to generate the minimum steps, procedures, and/or online investigation time to accurately complete the challenge and/or game and store this data as part of the game data file at step 318.

At step 320, the user plays the game or otherwise interacts with the program. During game play, the system is configured to track and store the user's interactions, time and email correspondences in the user's data file created at step 316. User interactions may comprise any of receiving a user input, such as a mouse click, a text entry, data from speech recognition unit, input from an accelerometer or other motion or position detector, electronic or wireless communication, etc. or even receiving no user input for a period of time.

According to one advantageous embodiment, the system at step 318 is configured to store a plurality of time periods associated with different expected user interactions in memory, which may be in the term of a table of user interactions and associated time periods. During game play at step 320, when a user request is received to interact with the system, the system is configured to determine whether a time period is associated with the user interaction and, if so, to retrieve the time period from the memory or the game data file. The time periods may or may not be based on real time, or the actual amount of time passing while the user interacts with the game. According to one advantageous aspect, the time periods may be determined before receipt of a first user request associated with the time period, which may be before, during or after any of the steps prior to step 320 in FIG. 3. The time periods in this embodiment are not based on the real time of the user's interaction with the system. The time periods may be different for different builds of the system. The predetermined or pre-stored time periods may be referred to as online or "game time" as opposed to real time. For example, traveling through the website and conducting various tasks or interactions results in a certain amount of accumulated or summed time which is summed by the system, and which may be used by the system to determine whether the user has achieved the one or more of the objectives. One or more embodiments may advantageously ensure that each user will have a same timeframe of opportunity to conduct an online investigation, regardless of mode and speed, connection speed, etc. in an online environment and regardless of other constraints of their circuitry or system or time committed to the game, such as pauses, taking a break, etc. According to one embodiment, the time attributed to or associated with a proposed interaction may be displayed or communicated to the user to give the user an opportunity to confirm that the user wishes to carry out that execution before incurring the time required for the interaction. Alternatively, the time may not be communicated to the user and may or may not be communicated to the user during the game. The time period attributed to the user's interaction may be stored in the user's data file.

A step 322 may be provided whereby a solution or other user input is received, such as a proposed answer to solve an objective. At step 324, the system is configured to access the user's data file and the game data file created as the games were generated in steps 314 and 318 and updated as the game was played to make a determination as to whether the user has achieved one or more objectives (e.g., to validate the user's intentions, which may comprise a guess or proposed solution, etc). Any of the data stored in the user's data file and/or game data file may be used to make this determination, and determinations may be made for multiple objectives. According to one embodiment, the system may be configured to determine whether a user is cheating and/or sharing information with other users. For example, as described above, a game data file comprises data indicative of a minimum number of steps determined by the system and/or designer of the system, procedures, and online time that evidences whether a complete investigation has been accomplished, or that the answer was guessed without having conducted a reasonable investigation or that the user has cheated by obtaining information from another source. The system may be configured to indicate that the user is disqualified from any game or prizes or rewards associated with the system. As another example, if the user's data file does not indicate that certain information determined to be vital by the system and/or a designer of the system, such as by way of an email or by another way of other interaction with the system, the system makes a determination that the user has cheated or that the user's proposed solution to meet the objective is otherwise invalid. During play of the game, information in the user's data file may further be used to determined whether additional information, web pages, or other data within the website shall be unlocked or allowed to be accessed by the user. As described with reference to step 324, if an online gamer skips steps, does not obtain information deemed crucial by the system and/or system designer, does not collect evidence from similar web pages, and/or does not request to receive specific emails containing information and evidence determined to be vital, the system is configured to determine that the online gamer did not conduct their own investigation and/or to disqualify the user from this game or from receipt of certain additional information in the game. According to one advantageous aspect, such an aspect prevents lucky guessing at the solution of the game. The system may further be designed to ensure that each individual website design has an accurate flow and ending that the game can be accurately solved if played correctly. At the time of the build, the system may be configured to store all of the codes (e.g., unique codes) that are needed to accurately solve the game into the game data file. Once the user has completed the game, the system may be configured to access the user data file and the game data file and compare codes therein to determine if the user has the necessary codes to warrant a correct conclusion. This may be part of the objective determination unit processing.

At a step 226, when results, rewards, objectives accomplished, etc. may be reported to the used and/or to an entity associated with the game so that rewards may be delivered or presented to the user.

Figure 4:
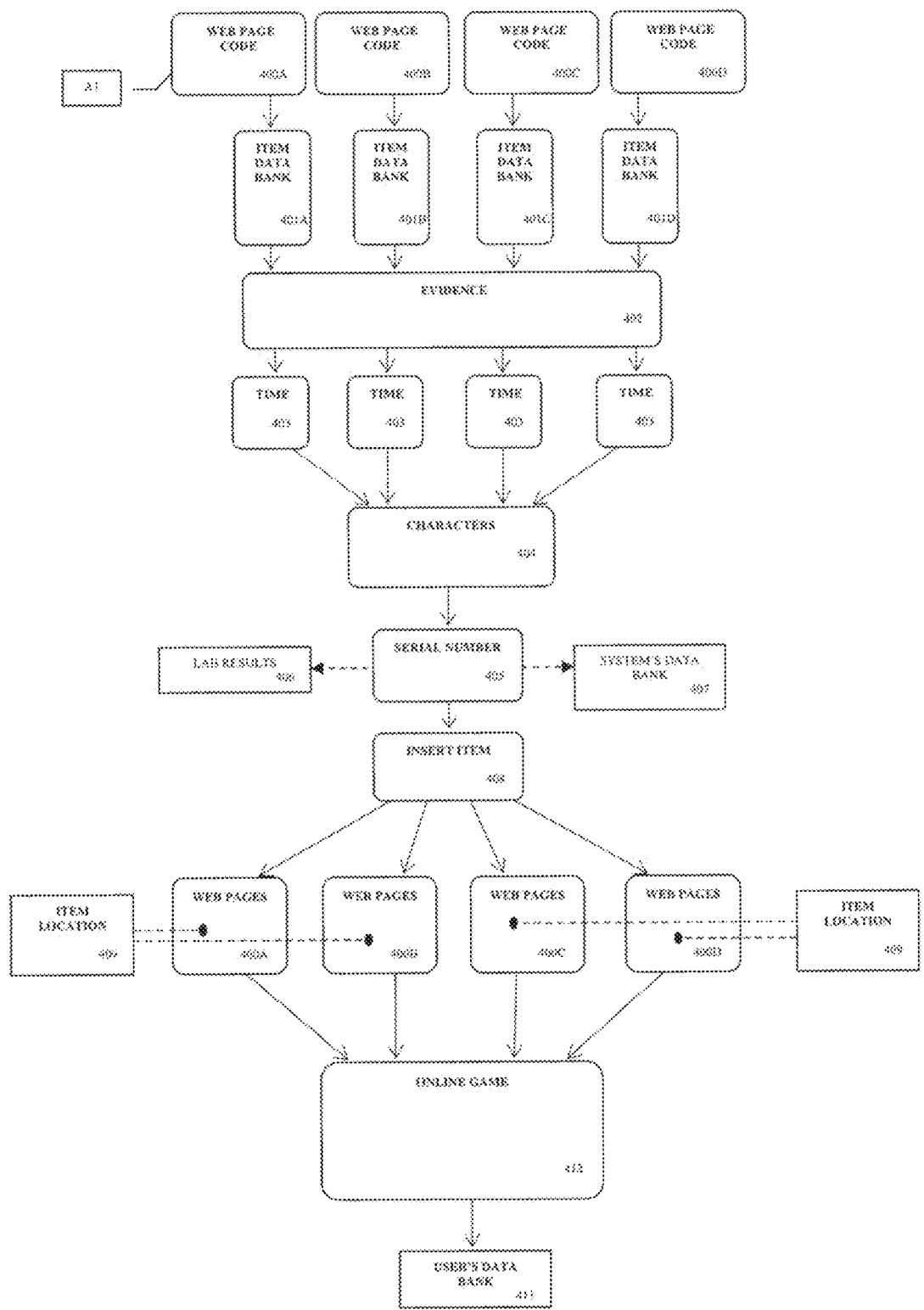
FIG. 4 is a flow diagram of a system and method for providing an objective to a user, according to another exemplary embodiment.
Figure 5:
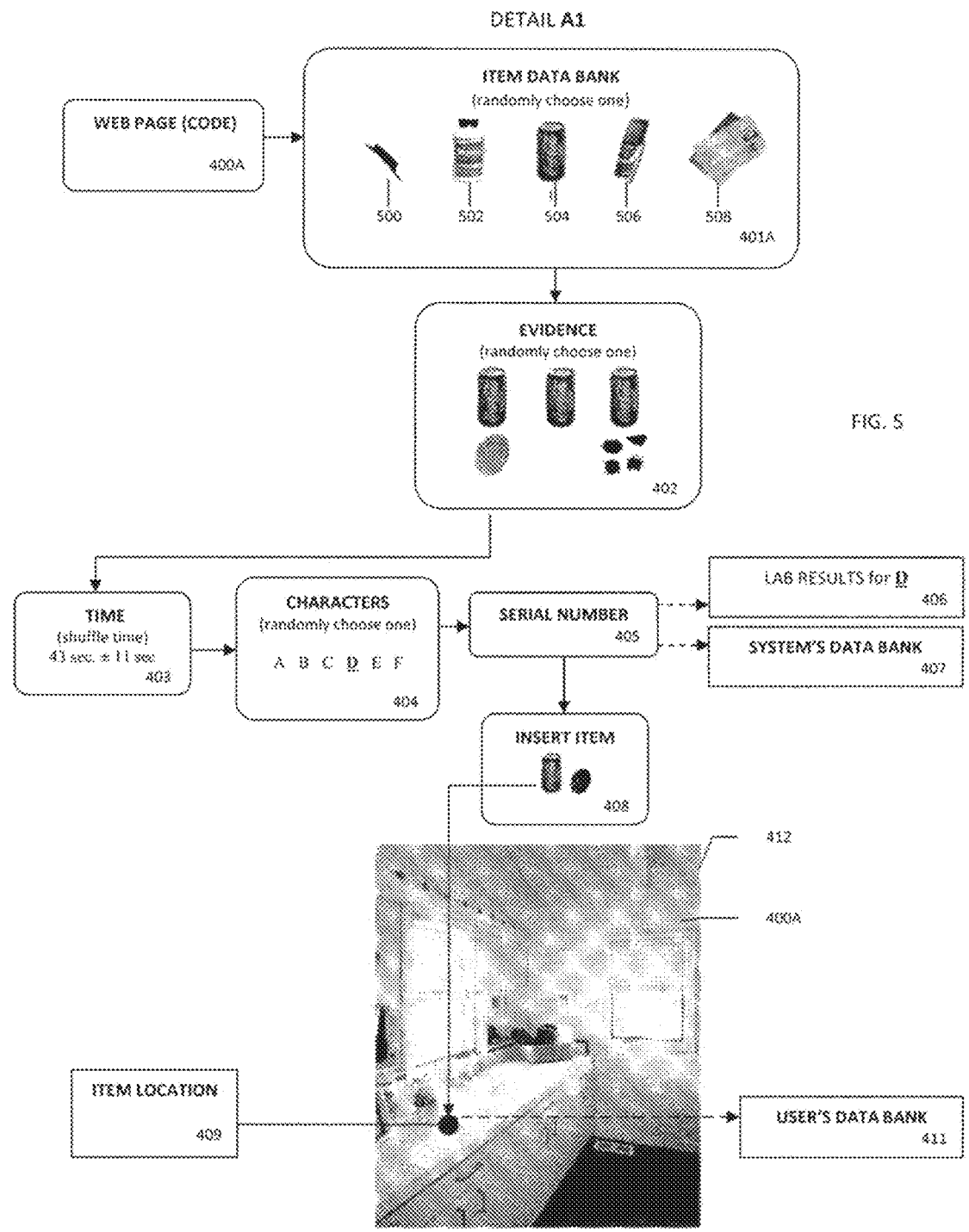
FIG. 5 is a flow diagram showing additional detail of the system and method for providing objective to a user of FIG. 4, according to an exemplary embodiment.

Referring now to FIG. 4, a flow diagram of a system and method for providing an objective to a user is shown according to an exemplary embodiment. In this embodiment, varying information and content are used to create unique web pages for an online game. A web page may represent any scene, such as an interior room of a building such as a house, an exterior area of a house, vehicles such as cars, boats, etc., other buildings, landscapes, etc. Components or items can refer to any man made or natural items. In this exemplary embodiment, shown in algorithm steps provided in FIG. 4, fixed components compose a plurality of web pages in the form of web pages 400A-400D. One or more of the web pages are selected by the system, and each web page is assigned a web page code different from the codes of the other web pages to provide unique codes for each of the web pages for the system to be built. Each web page is configured to provide variable item locations, each item location also assigned a different location code, which may be unique. One or more item data banks 401A-401D are stored in the memory, each comprising one or more variable components which may be selected and used to populate any of web pages 400a-400d. The variable components (e.g., items) may be predesigned for predetermined locations within a web page and may have a serial number (e.g., unique) or other code assigned to them. The system may be configured to variable (e.g., randomly, etc.) choose one item from the item data bank or data files 401A-401D and record the item's serial number into the game data file. Referring to FIG. 5, exemplary items are illustrated in the form of a weapon item 500, which in this embodiment composes an image of a knife and an item code associated with the knife, which may also comprise other data or metadata about the item, such as how it may be interacted with by the user, whether it may be picked up, whether it may be put down, whether it may be used defensively or offensively by a character operated by the user in the game, the serial number or code, etc. Other items shown in exemplary form comprise a pain reliever container 502, a soft drink or soda can 504, a mobile communication device such as a cell phone 506, and an account card such as a credit card 508.

Each of web pages 400a-400d may comprise a shell web page which may comprise fixed or non-interchangeable scenes or objects, such as landscapes, buildings, roads, etc. The variable components may comprise data or data files representing props, streaming videos, clues, branded products a Coke™ can, a Ford™ truck, a Nokia™ cell phone, etc.), evidence, actors characters (who may further have interchangeable dialogs), etc. The items in item data bank are variable between different builds, which may be varied or interchanged using a randomization process, pseudo-randomization, cycling through a number of different items in a predefined order, shuffling, or otherwise selecting the items to populate the web pages using any desired algorithm.

Returning to FIG. 4, at step 402, other variable data in the form of evidence data is selected by the system variably, which may be associated with the item data previously selected in steps 401A-401D, and/or locations in the web page shell in steps 400A-400D. Referring to FIG. 5, exemplary evidence is shown as a fingerprint, no evidence, and blood stains, any of which may be associated with the Coke™ can item 504 selected from the item data bank.

Returning to FIG. 4, at step 403, time periods (e.g., in game time or real time) associated with certain user interactions are selected, which may be done by calculating, retrieving from memory, pseudorandomly generating, or otherwise generating the time periods associated with the time required for the user to interact with the evidence and/or items and/or fixed data in the web pages previously selected in steps 400A-400D, 401A-401D, and 402. The time may be selected randomly, such as being shuffled. For example, the system may be configured to access an item data file, each item data file comprising several items, to select an item. Each item may have a time period which may further comprise a variance assigned to each item and/or its expected user interaction. Each interchangeable item may be assigned a base time with a defined time (+/−) variance. During the build process, the system may variably select items from various data banks and with each item the system may variably (e.g., randomly) assign a time, within the item's time variance. The system may then record the item's signature (code) and time to the user's game data bank. Shuffling the time associated with each item in each game creates unique time codes to prevent any would be hacker from figuring a "time code formula" to solve the game. The system may build each game so that every game has the same total or summed time (or partial sums of times for different portions of the game) to accurately solve the challenge; this may provide a common denominator for every game, which may also prevent cheating or guessing in the system. If a user finishes the game under the least amount of time to accurately solve the game, which may be determined by the game designer and/or the system generating the game, the user is disqualified.

Returning to step 401A-401D, specific items are assigned location codes so that it may be determined where the items are to be located in the web pages, which location codes may be variably selected so that different builds of the system may have items in different web pages or different locations within a web page.

Referring again to FIG. 4, at step 404, one or more characters are selected for this build of the program, which may be selected variably using any of the techniques described herein. As shown in exemplary form in FIG. 5, the characters may be randomly selected from a database or table of characters created by the designer of the system. In the embodiment of FIG. 5, character D is selected and added to the game data file.

Returning to FIG. 4, at step 405, the system is configured to assign a number, such as a serial number, which may be different from other serial numbers for other items or may be unique, which serial number is stored in a data file as shown as step 407. As shown in steps 401-405, each item selected in step 401 may be associated with evidence selected variably at step 402, associated with a time selected variably at step 403 and associated with a character (e.g., the fingerprint or blood selected in stop 402 is that of character D as selected, in step 404), and the components associated with the item comprise a data file associated with a serial number at step 405 and stored in the game data file at step 407. Serial numbers may be selected variably, such as, sequentially, randomly, pseudorandomly, etc.

At step 406, a lab results data file is created associated with each data item having a serial number. The lab results function 106 provides a predetermined output data based on a user interaction or set of user interactions configured to trigger output of the data. For example, the output data may be an identification number or serial number which is provided to the user's profile in response to the user performing a certain action on the item constructed in steps 401A-405, such as receiving a user request to dust a Coke™ can for fingerprints and submit the evidence to a crime lab. Lab reports process 406 can be any results processed in alternative embodiments. The output data may be a serial number or code which can later be checked to determine that the user correctly interacted with the item to collect the evidence needed to solve or accomplish the objective, or to open other web pages, portals and/or information, or may be an identification number associated with the character, which may be provided to the user and/or stored in the user's profile.

Returning to step 405, in an alternative embodiment, the system may be configured to assign a serial number unique to or associated with the web page 401A-401D and with the incorporated item, including the items associated time, evidence, and/or character.

Returning to FIG. 4, at step 408, the system inserts the item created in steps 401-405 into one or more web pages 400A-400D at a predetermined item location 409, which may be different for different web pages. As illustrated in FIG. 5, a web page 400A, which may be computer software representing a room of a house, comprises an item location 409, which in this case may be a countertop to the left of a sink, into which the system inserts the item 408 in order to create in part this build of the game. Item locations may be at predetermined or designated areas or locations within a web page 400A-400D that allows items to be incorporated therein. Online game 412 as shown in FIGS. 4 and 5 is a build of the game, such as system build$_t$ 212 in FIG. 2.

Step 411 illustrates the user's data file or data bank which is configured to receive the item's serial number and time and store it based on receiving a user interaction with the item which meet predetermined criteria, such as having been sent to lab results step 406, such as having been picked up by a user, baying been searched for evidence, etc. User data file 411 may then be accessed and compared to the game or system data file or data bank to validate the user's conclusion or guess or solution, for example to confirm that all vital codes stored in the game or system data file have been received in the user data file to constitute a valid conclusion. The system may be configured to record every user action or interaction with the system, select user interactions with the system, or only one or a few user actions with the system, and to use any interactions collected to determine whether the objective of the game has been met or whether the objective has been met properly in accordance with predetermined or predesigned criteria.

Figure 6:
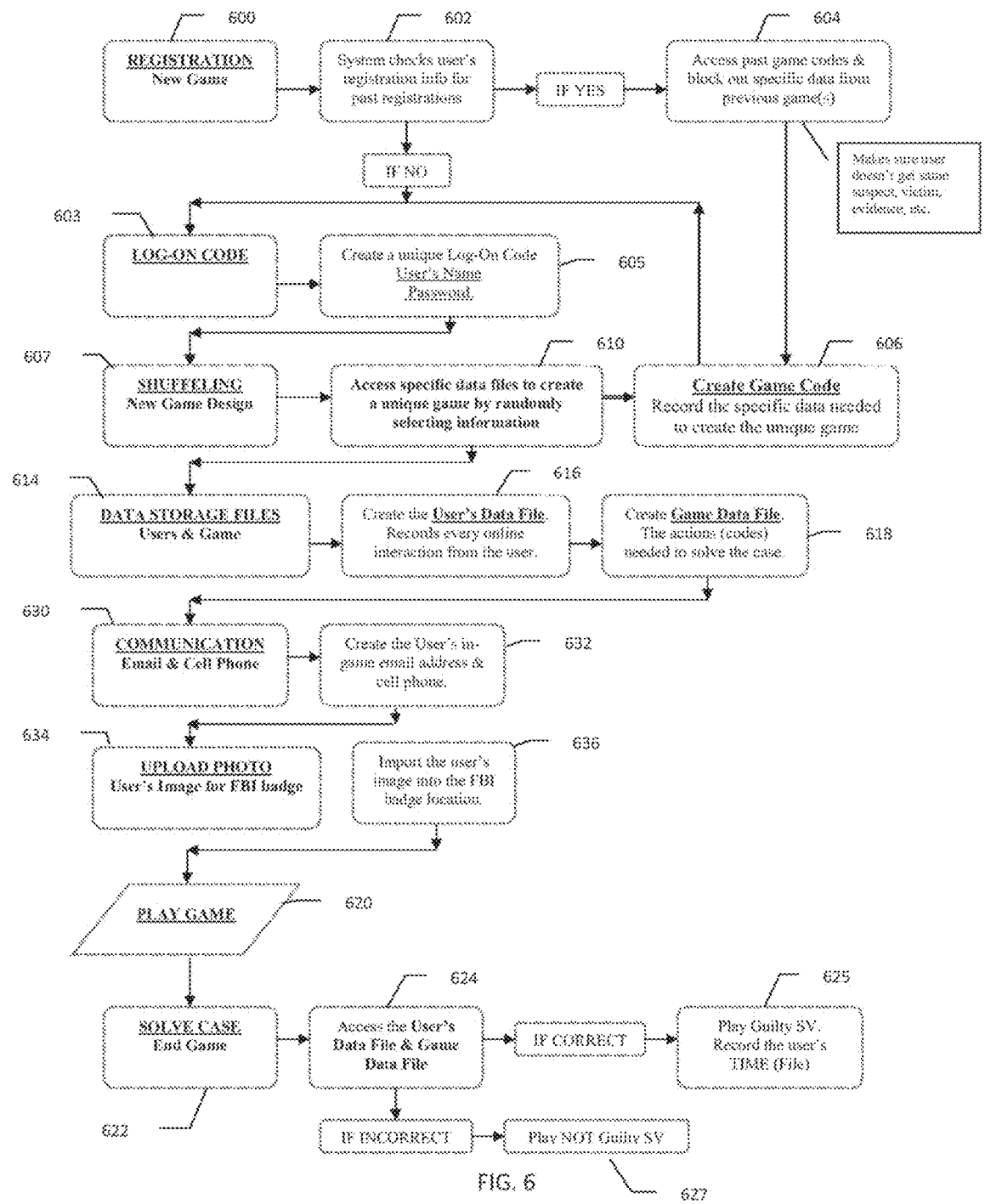
FIG. 6 is a flow diagram of a system and method for providing an objective to a user, according to another exemplary embodiment.

Referring now to FIG. 6, an exemplary method and system according to another embodiment will be described. Reference numerals similar to those in FIG. 3 describe similar algorithm steps as those in FIG. 3. At step 602, in this embodiment a user address, such as home address, email address, etc. is used to determine whether the user has previously registered with the system to participate in the program, which in this case is a game program.

In this embodiment, after step 606 in which a game code is created for a returning user, or if this is a first-time user as determined at step 602, at step 603 a log-on code is created and stored in the user data file. The log on code may uniquely identify the user and this iteration of use of this particular game. At step 605, a username and password is received from the user and associated with the log on code. At step 607, a new game design is selected from a plurality of predetermined game designs, for example having fixed components, such as environments, rooms, geographic locations, fixed components within rooms, etc. At step 607, the fixed components or game design are selected from one of a plurality of predetermined game designs in a variable manner, such as randomly, shuffled, pseudorandomly, sequentially, etc. The process then proceeds to step 610 to access variable data as described with referenced to FIG. 3 and/or FIGS. 4-5.

The embodiment of FIG. 6 further illustrates additional features at steps 630-636. After the game data file and user data file are created at step 618 and 616, at step 630, a communication module is configured to determine or configure communication options, such as electronic mail, mobile phone, or other communication options for the system to communicate with the user. At stop 632, the system is configured to generate an in-game email address and/or account. The system may then be configured, during game play at step 620, to receive, email requests or interactions from the user, process those requests by generating a response relevant to the game, and sending an email back to the user in response. The system may be configured to provide the user interface, within or internal to the game environment for both the receipt from and transmission to the user of email messages. Each user may be able to create their own unique e-mail address per individual websites. One or more embodiments may prevent public knowledge of any information the user has acquired during their online experience by using an e-mail communication system internal to the system as opposed to external of the system (e.g., a user's Gmail™ or Yahoo!™ account). The system may further be configured to prevent forwarding of e-mails from the internal account to any third party, and/or to prevent printing of such e-mails or communications. The system may further be configured to receive a mobile phone telephone number to allow the system during game play to send text messages, multi-media messages (e.g., MMS, SMS, etc.), or other messages to a user's cell phone using a cellular telephone network. The messages may be sent in response to user requests, or may be sent to provide additional clues in response to certain user interactions, such as entering a room, waiting a certain predetermined period of time once within a room or web page, randomly or pseudorandomly, or at other times during the game play.

Referring now to FIG. 6 at step 634, an upload photo or video function may be provided wherein a user is prompted to upload digital photo, video or other media to the system as will be described in greater detail with reference to FIG. 10. In this embodiment, a user may upload a digital image of the user, and the system may be configured to incorporate that image into an item within the game, such as a badge for the FBI, such as in the case where the user is an FBI agent in the game. At step 636, the system is configured to import the user's image into the FBI badge location which may be a fixed or variable location, and which may be added to a user data file or otherwise stored in memory.

After the game is played and a solution is received from the user, at step 620 and 622, the user's data file and game file are compared to determine whether the user has met one or more objectives at step 624. If the user has met the objective by solving the case properly, collecting all of the items and evidence needed to provide a proper case, at step 625 a "guilty" software visualization is played for the user and the user's total accrued time whether in real time or in game time is stored in a memory, such as the user's data file, for retrieval by an entity operating the system to determine whether a reward should be provided. Alternatively, if one or more of the objectives are not met at step 614, the "not guilty" software visualization is provided at step 627, which may similarly be recorded and/or reported to an entity operating the game.

Figure 7:
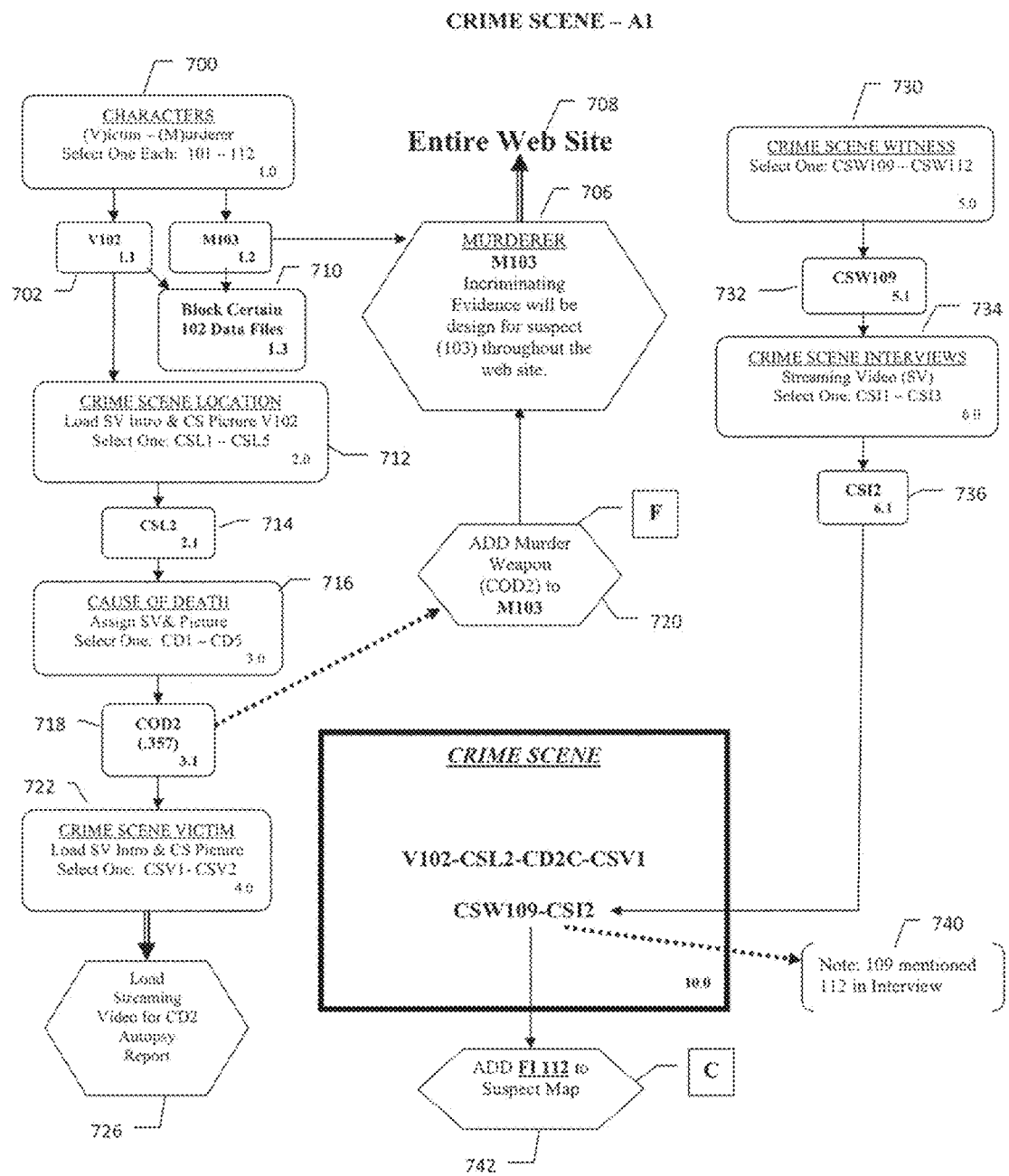
FIG. 7 is a flow diagram showing steps relating to generating a crime scene in the system and method for providing an objective to a user of FIG. 6, according to an exemplary embodiment.
Figure 8:
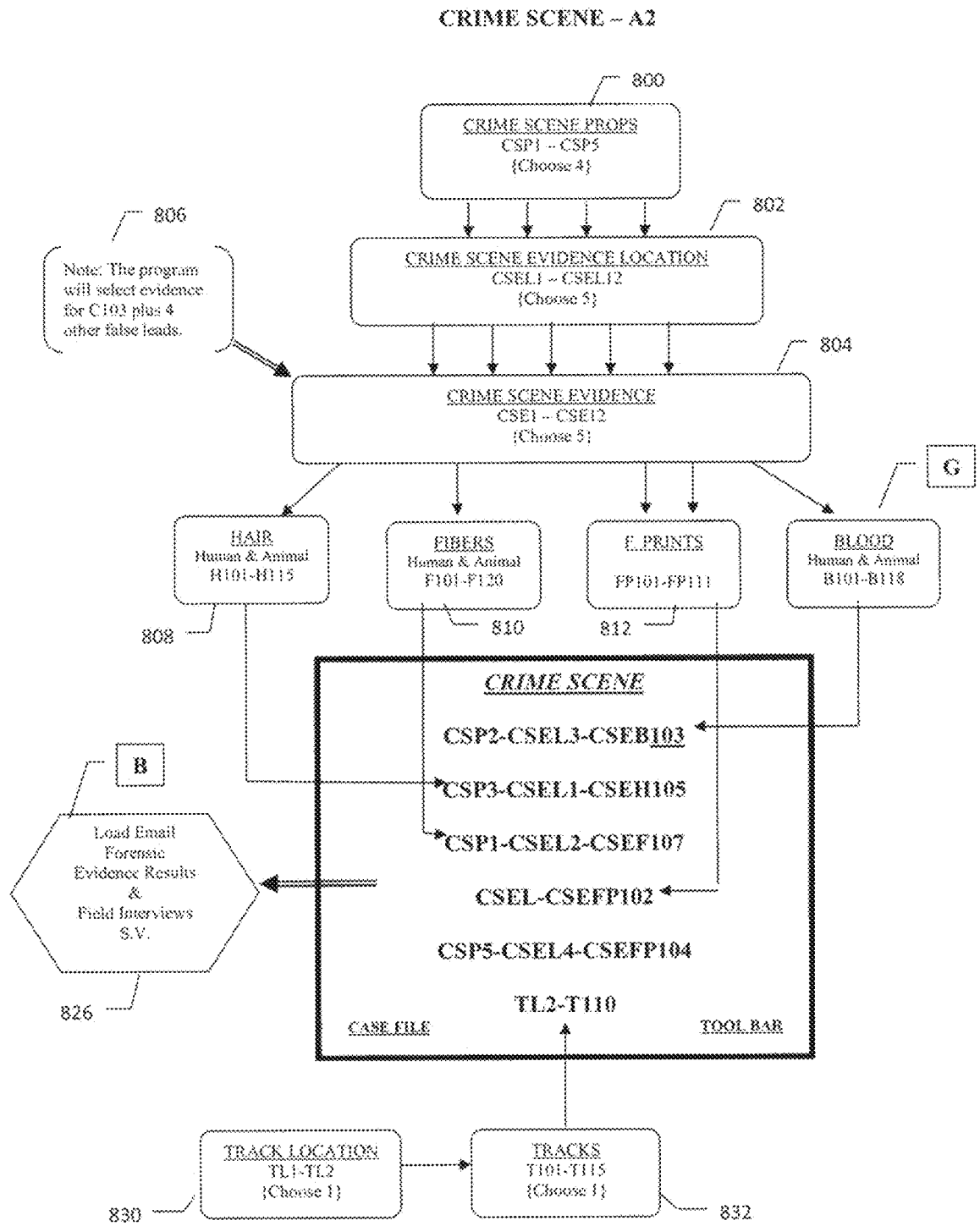
FIG. 8 is a flow diagram showing steps relating to generating a crime scene in the system and method for providing an objective to a user of FIG. 6, according to an exemplary embodiment.

Referring now to FIGS. 7 and 8, an exemplary system and method for generating a build of a system will be described with reference to an exemplary embodiment in which the game design is a murder mystery game. One or more of the step described in FIGS. 7 and 8 may be combined or interchanged with steps in the other embodiments described herein. Steps 700, 712, 716, 722, 730, 734, 800, 802, and 804 may represent steps performed on data banks wherein the system randomly or otherwise variably selects items and information to be incorporated in to the web site build. FIGS. 7 and 8 illustrate an algorithm in certain steps to be performed during the generation of the game as well as certain portions of the built game based on the steps performed. The steps may be performed in any order. At step 700, a character is selected from the data file comprising a plurality of characters, numbered 101-112 in this exemplary embodiment. The system is configured to select a character data file for a victim and a character data file for a murderer variably. In this embodiment, character 102 is selected as a victim as shown at step 702 and character 103 is selected as the murderer as shown at step 704. At step 705, one or more items or components of incriminating evidence will be selected from a predetermined content database, the evidence having been designed for this particular character. Incriminating evidence is distributed to one or more different pages, environments, rooms, or other portions of the game environment, shown in the exemplary embodiment as the entire website 708.

Returning to step 702, certain data files are blocked at step 710 from being incorporated into the system build based on which character has been selected as the victim. For example, a video of character 102 speaking, giving testimony, or walking about the environment is not incorporated into the system in this build, since the character is the victim and is presumed to have been murdered before the user begins interacting with the system.

At step 712, the system is configured to variably select a crime scene location, numbered CSL1-CSL5 in this exemplary embodiment which may be selected variably. Further, a software visualization introduction is loaded from a predetermined content database of introductions, introductory video and a picture of the crime scene with character 102 is loaded and/or generated for use in the system. As shown at step 714, crime scene location CSL2 has been selected by the system. At step 716, the system is configured to select a cause of death from one of five causes of death in this exemplary embodiment, identified as CD1-CD5. A software visualization and photograph may also be selected from a pre-stored content database based on the selected cause of death which, again, may be variable. At step 718, cause of death 2 has been selected as death by shooting. At step 720, the selected murder weapon identifier of CD2 or COD2 is also stored in the murder data file M103, which may be used to provide evidence to website 708 such as providing the murder weapon in a room, providing fingerprints on the murder weapon, etc. At step 722, a crime scene victim is selected from crime scene victims CSV1 (male) and CSV2 (female). In this embodiment, the CSV1 and CSV2 are prerecorded live action videos that will inform the user if the victim is male or female in a live action video. Again, the system may be configured to select a predetermined software visualization introduction and picture of the crime scene victim. As illustrated at step 724, a crime scene environment or web page portion of the system or program may be provided with the variable components selected in steps 700 through 722. In this manner, when the user accesses the crime scene, the evidence associated with selected variable components of the characters, crime scene location, cause of death, and crime scene victims may be viewed by the user and interacted with by the user. The crime scene may further overlay additional graphics, such as a landscape, roads, etc. which may not already be part of crime scene locations CSL1-CSL5.

At stop 726, the system may be configured to load from a predetermined memory a video, which may be downloaded or streamed from a server operating the computer program which presents an autopsy report based on the cause of death selected in step 716. This video is made available to the user when the proper interactions are received during game play. In step 726, the video is loaded and associated with the game build.

At stop 730, one or more crime scene witnesses may be selected variably from a predetermined database of crime scene witnesses, shown herein associated with serial or identification numbers CSW109-CSW112. Each crime scene witness file may comprise one or more data, such as an image of the witness, textual or audible testimony or facts to be presented by the witness, the witness' demeanor, etc. At step 732, CSW 109 is selected and stored as part of the program build. At step 734, the system may be configured to select variably one of a plurality of club crime scene interviews, which may comprise streaming video, downloaded video, text, streaming or downloaded audio, or other components of a crime scene interview data file. In this embodiment, one of crime scene and interview in CSI1-CSI3 may be selected. As shown at step 736, crime scene interview CSI2 is selected and stored in the crime scene 724 along with the crime scene witness data from step 732.

At step 740, an additional variable component may be associated with the crime scene, such as the fact that character 109 mentioned character 112 in an interview, which data may be accessible by the proper user interaction during game play.

At step 742, additional data is added to the game build based on the selected crime scene witness and/or crime scene interview. In this example, FI 112 represents a location of a suspect on a map or other geographic area associated with the game build (wherein the geographic area may be a fixed and/or variable component). With this additional component of the build, when the user requests to view a map, the location of suspect 112 may be shown in the game's map web page. This location may be identified to the user from the beginning of the game, or only after the user has interviewed crime scene witness 109. With new information (FI 112), new web pages or portals are available to the user.

Continuing with the game design as shown in FIG. 8, additional variable components may be selected to provide this build of the game, such as one or more of crime scene props data CSP1-CSP5 at step 800 (a predetermined number, such as four are selected in this embodiment), a crime scene evidence location 802, shown as CSEL1-CSEL12 (five are selected in this embodiment), and crime scene evidence 804, which may be any of CSE1-CSE12 (five are selected in this embodiment). The system is configured to select evidence to lead the user to character 103 as the murderer. In this embodiment, the program is further configured to select evidence for a predetermined number or additional characters which will be provided as misleading information or false leads to the user. This misleading information may also be variably selected. Misinformation or false leads may be provided to one or more of the web pages or environments of the system, which may comprise bogus clues and add deception and complication to the user's goal of solving the objective or challenge. The program may further be configured to ensure that each build of the game has an accurate flow and ending so that the game can actually be solved by the gamer if played correctly. During the game build process, the system may record all the necessary and/or vital codes and/or serial numbers for specific items, locations, evidence, video clips, etc. into the user's game data file. At the end of the game, the system may access the user's data file and the user's game data file and compare codes and serial numbers to insure that the user has conducted a thorough investigation and the user's conclusions are warranted.

Crime scene evidence may comprise one or more of hair evidence H101-H115 (step 808), fiber evidence F101-F120 (step 810), fingerprint evidence FP101-FP111 (step 812) and/or blood evidence B101-118 (step 814), any of which may be human or animal in this exemplary embodiment. As shown in crime scene 824, a crime scene prop, crime scene evidence location, and crime scene evidence may be provided at the crime scene for the selected murderer (character 103 in this embodiment), and for the four misinformation clues (shown as CSEH105, CSEF107, CSEFP102 and CSEFP104 in this embodiment). Accordingly, the system is configured to present to the user upon entering the crime scene a variable component of evidence at a variable location which may be associated with a variable prop, all associated with a variable character. The system allows the user to interact with the items. As is shown at step 826, the system is configured to load email, forensic evidence results, and field interview software visualizations for presentation to the user during game play associated with the items selected for this build of the game. Data banks 830 and 832 are predesigned images/items the system may variably select from during the build process. For example, at step 830, track location TL1 or TL2 are specific locations within a web page to input a track (e.g., a shoe print, tire track, animal print, etc.). At step 832, tracks T101-T112 are specific detailed images (e.g., shoe print, tire track, animal print, etc.) of the track and/or other data associated with the track (e.g., serial number, other metadata, etc.).

As described in the exemplary embodiment of FIGS. 7 and 8, evidence associated with each interchangeable item is also interchangeable and variable. For example, a Coke™ can may have a fingerprint or lipstick smudge or other DNA evidence on the product. Furthermore, the evidence results are also interchangeable. Each interchangeable item will have a unique serial number, identification number, or signature, which may be alphabetic, numeric and/or alpha numeric with a game time and a time variance assigned to the object.

Using the example of an online interactive murder mystery game, FIGS. 7 and 8 describe a method of creating a website or build of the game which comprises photos, locations, computer graphics and/or animated generated web pages for display to and interaction with the user. For each build or design or iteration of the system, specific predesigned data files may be selected and variably or randomly chosen, including the victim, the cause of death, the suspects, the items and their associated characteristics, etc. The system may be configured to insert the needed information and content into certain web pages or environments that, if deciphered correctly by the user or online game, the user or online gamer can accurately solve the case. The system may further input misinformation dead-ends, or bogus clues throughout the website or build of the game. Once built, the system may be configured to encrypt and store the web pages and their signatures, as well as the information needed to accurately solve the game. Exemplary algorithms for encrypting codes are described with reference to FIGS. 12 and 13.

While different builds of the game may be different, different builds may have the same victim with the same cause of death but the evidence found on the body may be different, which may link it to different suspects. Thus, in some embodiments, components which are variable in one embodiment may be fixed in another. In the example of a military war game, several web pages may have the same town or buildings, but the enemy may be positioned differently, as another example of the variability.

Once the computer system has designed a build of the game, thee computer system will calculate how many procedures, steps and/or time it takes to accurately solve that specific game or that case or iteration of the game, which may be a minimal number of procedures, steps and/or time to assist in detecting cheating, such as information sharing among users. During the build process, the system may record every vital interaction code (e.g., steps, items, locations, props, etc.) and time codes into the user's game data file to accurately solve the game. At the conclusion of the game, the system may access the user's data file and game data file and compare codes to make sure the user has a valid conclusion. According to one embodiment, the computer software may be configured to give different participants a substantially equal challenge or playing field, which may also be a similar challenge regardless of how many times the user has played the game.

According to some embodiments, the items of information or components of the game may comprise fingerprints, criminal background checks, bank statements, license plate numbers, search warrants, autopsies, forensics evidence, etc.

According to some embodiments, the system may be configured to provide request forms which the user may find in an environment, select a suitable user interface, fill out with the requested information, and email to the system. In response, the system may be configured to determine whether the information was properly requested, and if so, the requested information will be sent to the online gamer via an email internal or external to the system. When the user requests information from the crime lab (e.g., a fingerprint), the system may access the user's game data file, select the correct information (from the initial design build), and forward the fingerprint identification via email, text message or video to the user. The system may store this action or interaction into the user's data file. Due to the variability, some builds of the online games will have a same or similar beginning (e.g., cause of death, victim, etc.), but may change substantially towards the end of the online game.

The system will further be described in exemplary embodiments with reference to user interactions with the system, such as playing the game, etc. The user is presented with an initial web page or environment with which to interact, and may further be presented with options for moving to other environments or web pages within the web site. When confronted with an item displayed for the user, the user may interact with the item, for example by clicking on the item, which may then provide a display giving the user certain options with respect to the item. Using an interactive online murder mystery game as an example, in a sheriff's office, which may be a start and/or finish location of the game, the user is presented with two manila folders, one labeled "locations" and the other labeled "suspects." By clicking on the location or suspect folder, an aerial view map of the entire town is provided. By moving a cursor over the desired location or suspect, you will see the amount of game time needed to travel to that location. By clicking on the location or suspect, users will be prompted if they wish to travel to that location, which, upon receipt of a confirmation from the user, will automatically add time to the online investigation, which is stored in the user's data profile. A prompt to "click yes?" is provided that if clicked, will make the user arrive at that location.

As another example, if a user desires to gain access to a house, he must first fill out a warrant form and email the form to the system. Once the warrant form has been sent, for example, via an email account internal to the system or game, the user will receive via email from the system an access code that will enable the user to "unlock" the door and conduct the investigation inside the house. In various embodiments, the user must have access to specific web pages and/or gain specific information in order to unlock other web pages. According to one further feature, the system may be configured to access data in the user's profile before issuing the search warrant code to validate that the participant has interacted with predetermined web pages, environments, or other variable or fixed components such that the search warrant is merited. Alternatively, the warrant request may be denied if the user data file does not contain the required data, such as an alpha numeric web page signature.

Upon entering a house, the system may be configured to provide the user with a visual "location bar" which will display a plurality of different rooms, such as bedroom, kitchen, living room, bathroom, front door, etc. In response to a click from a user on one of the room identifiers, the user enters the room (i.e., the system provides an environment or web page for display to the user). Each room may have a specific investigation time allocated to it, which will be recorded in the user's data file upon selection of the room for investigation. For example, once the user enters a room, the room may provide several "go to" spots which the user may select to investigate further, which will present a portion of the room as a "go to" spot, thereby showing a different views of the room and allowing the investigator to conduct a thorough investigation. Different portions of the room may further comprise "hot spots", which may comprise a hyperlink, executable code, an applet, or other portions of code that will launch when the user selects them or moves the cursor over them, such as dresser drawers, cabinets, bed covers, etc. The hot spots may be open by clicking on them, which may then reveal other visual evidence such as a blood stain, hair, fingerprints, etc. An "evidence gathering toolbar" may be provided which allows the user to select which evidence task you wish to perform, such as dust for fingerprints, collect blood sample, decipher code, send to lab, etc. The user may then be allowed to exit the room or the house by clicking a "door button" such as a front door button located on a sidebar. Upon returning to the front door, the "location bar" changes to an external location thus allowing the user to travel to other locations.

The embodiments described herein are not limited to providing games, but may further include other applications, such as educational tools, other entertainment tools, or military applications, etc. In a military application example, the computer system may be configured to create different builds or iterations of the system, may different websites using predesigned components which may comprise fixed components across different games and some variable components, selected randomly, sequentially, etc. as described hereinabove. Within a particular build or website page template, the program can be configured to change the position of an enemy military unit, an arsenal of weaponry, strengths, locations, etc. Further, the computer system may be configured to choose from a number of predefined military scenarios, including but not limited to, a level of threat, a type of threat, a global location of the enemy, etc. The software may be configured to calculate the priciest movements (e.g., in terms of game time) and tactics to complete a successful mission in each game. Similar to the murder mystery game, every action by the user may be stored in a user data file. The correct movements and tactic codes are stored in the user's game data file.

The system may be configured to provide color-coded map locations (which colors may be associated with characteristics of the maps locations) on which you can move troops, tanks, ships, air support, snipers, spies, etc. The system may be configured to provide intelligence reports via email to inform the user of information about an enemy force. Intelligence reports can operate similarly to the lab results or warrant requests of the murder mystery embodiment. For example, if a hidden target is attacked without first receiving a specific email or intelligence report via email from the system, the system determines that the user has received their evidence from an outside source and, therefore, may be configured to disqualify the user from further play and/or accomplishing the objective and/or providing any prize.

Once the system has received interactions from the user to engage them in a battle, email intelligence may be sent to the user to inform them about the fight and the options, such as advance, hold, or retreat, and provide options in highlights to move to certain areas on the battlefield. The intelligence will also inform the user on casualties, wounded, killed, etc. The system may provide options for the user to send in medical teams to assist the wounded. Updated intelligence reports can be received and/or requested by the user to inform the user of any threats in the area (e.g., rocket propelled grenades, etc.). If RPGs are present and an air vac, medic vac, or other medical unit is sent in, it will be shot down, which can add casualties to the user data file. According to one embodiment, an objective may be eliminate the enemy with the least number of correct tactical maneuvers and least amount of casualties to troops and civilians. Any of the above components may be fixed and/or variable and may be built by the system to create different iterations or builds of the system using the variable data within the fixed data components to provide different experiences to different users or different experiences to the same user upon multiple log with the system.

According to another example of the variability of the different builds of the system, the computer program can be configured to design a predetermined number (e.g., less than ten, less than five, more than two, etc.) iterations, builds or embodiments of the system, such as a website game, which may be accessible from a single website. The computer program can then be configured to variably choose, such as randomly, sequentially, etc. one of the predetermined number of game scenarios, create a unique access code, email the access code to the gamer, and keep track of which game was sent to each participant or user to be sure that users do not receive the same game twice.

The computer program may be configured to use an algorithm that will scramble or encrypt each access code in a manner only recognizable by the computer program. Each of the predetermined number of different games will have different steps and procedures to accurately solve the game. The computer program will keep track of each gamer's progress. The different builds or iterations of the computer program may be generated by the system prior to a user first logging on, registering, and/or first interacting with the computer program. Alternatively, the one or more of the predetermined builds of the system may be provided after the user has logged on, registered, and/or interacted with the system.

Referring now to FIG. 9, an exemplary user data file is shown. The user data file may be stored in memory during registration by a user, creation of a build of the system, interaction or game play with the user, or other steps. Data field 900 is a log-on code which identifies or is associated with a user and a design build of the program. The log-on code may be generated using a secret algorithm formula, such as described in exemplary form with reference to FIG. 12. Data field 902 represents one or more components of user personal information, such as address, social security number, etc. Data field 904 through 908 are the encrypted serial numbers of items interacted with by the user when playing the game, but may alternatively be web pages visited, locations visited, etc. and are shown here to represent one, a plurality, or any number of serial numbers of items, which may be stored in encrypted or unencrypted format. Data field 910-914 illustrate game time associated with the items, but may alternatively include game time associated with other interactions with the system. Data field 916 illustrates the summation of the game times of interaction and/or item. Data field 918 represents any other user interactions of the system. Data field 920 represents one or more user images uploaded to the system for integration with the build of a system. Data field 922 represents uploaded video for integration with the system. Data field 924 represents other media that may be uploaded for integration with the system. Data field 926 represents requests received from the user for the email system provided by the system. Data field 928 represents responses sent to the user. Data field 930 represents other data disclosed herein or otherwise that may be stored in the user data.

Figure 10:
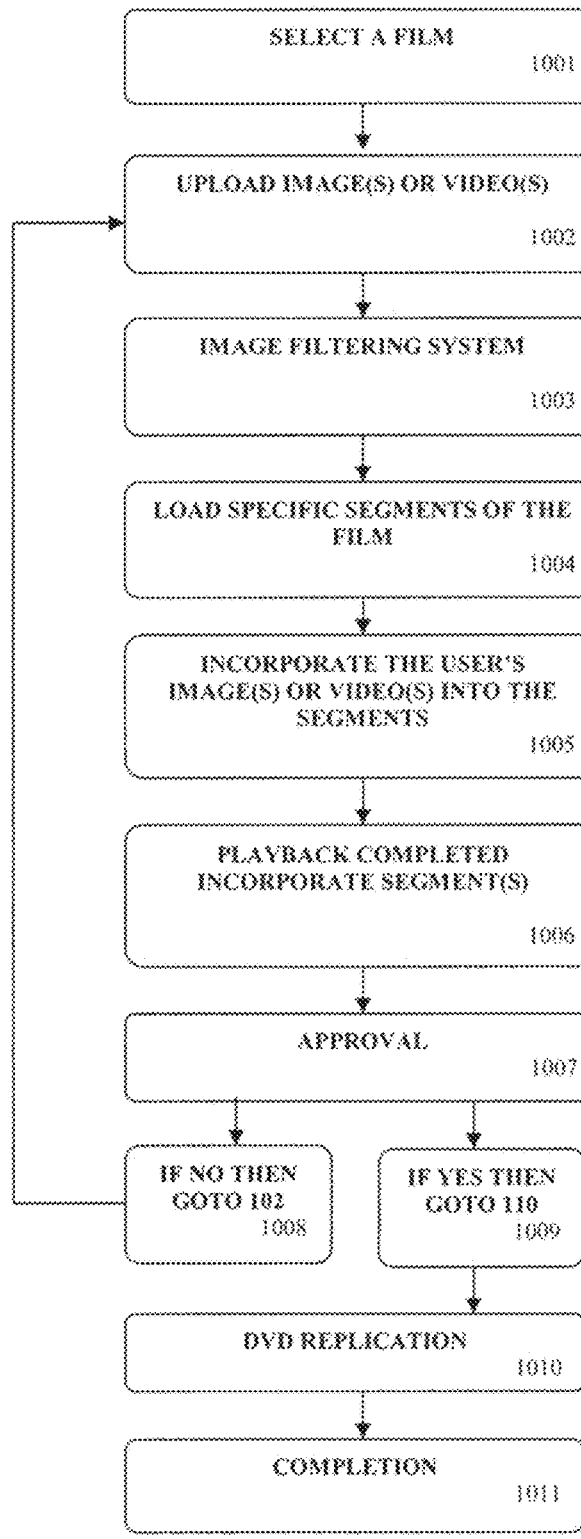
FIG. 10 is a flow diagram showing a system and method of media integration, according to one exemplary embodiment.

Referring now to FIG. 10, an exemplary system and method for integrating an image, video or other media or content into the system and methods in one or more embodiments described above or in an additional embodiment will be described. A user media or content may be integrated into another pre-stored or predetermined media or content, which may be part of an online game, treasure hunt, military application, training application, etc. as described above, or may also be any other media, such as a motion picture, feature film, movie trailer, video, movie, streaming video, movie clip, news reel, webisode, online game, music video, online internet advertisements, a digital versatile disk (DVD) and/or television show, etc. The method may be operable on a website accessible by client computers and operable on a processing circuit of a server in communication with the internet. The server may be configured to store one media and to allow users to upload a second media, such as amateur video, to the website. The server may be configured to select a media from an online library, which may be done in response to user requests after viewing an indexed table of contents of the library.

The system may be configured to adjust or filter the user's uploaded media to match one or more characteristics or specifications of the media into which the user media is to be integrated. The system may be configured to select precise segments or film frames within the film to incorporate within the media to incorporate the user's uploaded image or video into the media, thus creating a unique and individualized media, which may be presented to others, provided on a DVD, etc.

The user's image or video can either be incorporated within specific segment locations (e.g., back scenes, thumbnails, etc.) or added as an entirely new segment to the video. The system may be configured to provide a preview to the user. Once the user approves of their personalized media segment, the system will begin a DVD replication process or other merge of the data files for storage of other media such as another type of memory on the server or the client.

During a DVD replication process, the system may be configured to pause at one or more predetermined or designated segment locations within the media into which the user's media is incorporated, to incorporate the user's pre-approved or preselected segment of the media into the video stream or DVD. After the user's segment is recorded to the DVD, the system continues the replication process of the media. This process may occur several times throughout the replication process in the media to DVD. The system may further be configured to delete designated film scenes from within the film, replace scenes, etc.

According to one embodiment, a finished product may provide a user's amateur video seamlessly integrated into another media.

Referring to the end of FIG. 10, at step 1001, the system is configured to provide pre-stored media or information hereabout to the user. The system is configured to receive a user selection of the pre-stored media from an online internet library. At step 1002, the system is configured to prompt the user to upload the user media, such as images or videos. At step 1003, the system is configured to provide one or more steps to match the user's media with the selected media's quality and characteristic. According to one example, the pre-stored media may be in black and white and the user's media may be color. In this example, the filtering system may be configured to change the user's color image to a black and white image in order to match the film of the pre-stored media. Other fiber operations may include artist sketches, distortion, color enhancements, blur, etc. If a sketched "wanted poster" is hanging in a specific location within a video or web page, the Image (area) on the "wanted poster" may be interchangeable to the user's uploaded image. Because this specific location is coded as a "sketched image" the system may automatically create a sketch of the user's uploaded image and incorporate to the location, which may be performed using software such as Adobe Photoshop, manufactured by Adobe Systems Inc., San Jose. Calif., to convert, render, or filter an image to a "sketched" rendering.

At step 1004, one or more segments or locations within the pre-stored media may be loaded for editing. Each pre-stored media may have one or more specific segment locations within the media configured to receive or incorporate a user's media. The segment may be a location (e.g., a film frame) within a video or other media. A segment may be a single frame, multiple frames, or as long as several minutes.

At step 1005, for each segment in the pre-stored media, the user's media may be integrated within the scene or may be appended as an entirely new scene within the media. For example, the exemplary method described in FIG. 14 may be used. According to one example, a user's image may be incorporated within a picture frame resting on a table in a still or video media. The picture within the picture frame may be designated by the system to incorporate the user's uploaded image. The user's image may appear in the same number of film frames as the picture frame is in.

At step 1006, once the user's image or video is incorporated into the pre-stored media, the system may be configured to play back or preview the specific segments for the user's approval. At step 1007, if user approval is requested and if not approved at step 1008, the process may return to one of the previous steps, which is step 1002. If approval is received, the process at step 1009 may proceed to step 1010 at which a storage or replication process, such as a DVD replication process, may be initiated. During the replication process, the system may be configured to load the pre-stored image from a first source and, upon identifying a designated segment or predetermined segment for insertion of user media, the system may be configured to pause (or not pause) and to incorporate the user media at the segment location and to store in the replicated copy, which may be provided directly onto a DVD or onto other media. After the segment is recorded to the other media, the system may be configured to continue the replication process. This insertion process may occur several times throughout the replication process to incorporate one or more different media from the user into the new video. According to one embodiment, a finished product may comprise the user's image or video seamlessly integrated into the previously-stored media at step 1011.

Referring now to FIG. 11, a log-on and game code generation system and method will be described, according to an exemplary embodiment. A registration unit is configured to receive from a user predetermined personal information, such as name, mailing address, phone number, e-mail address, etc. A log-on code generation unit is configured to select specific alphanumeric positions ("n") in the registration data to generate a log-on code. FIG. 12 illustrates an exemplary embodiment of steps in a log-on code generation process. Returning to FIG. 11, a game build code unit is configured to assign a unique alphanumeric (or alphabetic or numeric) game code to a build of the game, the system having designed the build using unique web pages by accessing the system's item data files (and/or other variable and/or fixed data), as described in various embodiments herein. The game build code unit may be configured to generate the game code based on the log-on code (e.g., via identity or some derivation thereof, such as an encryption, scrambling, etc. of the log-on code with a crypt key or other data such as serial numbers of the items, interactions, etc. built into the build of the game).

A game data file unit is configured to access the user's log-on code and game code to create a game data file. The user's log-on code and game code may be used to index each game data file. Each game data file may be associated with a unique combination of user log-on code and game code (e.g., a user log-on code can be associated with multiple game data files so long as the game codes are different for different game data files, and vice-versa). Codes and serial numbers needed to accurately complete the challenge are stored in the game data file. A user data file unit is configured to access the user's log-on code and game code to create a user data file, in a similar manner to the game data file above. Interactions (including actions) the user has with the web site/game will be recorded into the user's data file.

An end game unit is configured to access the user's data file and game data file, check these files to make sure the user has conducted a thorough investigation and that the user's conclusion is warranted (e.g., by checking predetermined codes or types of codes for a match, etc.).

Referring now to FIG. 12, an exemplary method of generating a user's log-on code will be described. In this embodiment, a formula of $fn=(x+z)$ is used, in which n=the number or letter position, x=the alphanumeric position, z=predetermined numbers which may be any numbers which are predetermined, which in this case is a number stream of 3, 2, 5, 1, 0, 2, 6, 9, 2, 2, 1, 4, 3, 1, 0, . . . . Also, a predetermined associate of letters to numbers is used in this embodiment, in which A=0; B=2; C=3; D=4; E=5; F=6; G=7; . . . ; Z=36.

In this exemplary embodiment, the user's log-on code is based on the user's complete zip code of 12345 and phone number of 321-555-6602. Applying the formula, the first letter of the user's log-on code $f1=(x+3)=(1+3)=4=D$. The second letter $f2=(x+2)=(2+2)=4=D$. The third letter $f3=(x+5)=(3+5)=8=H$. Continuing with the formula for each digit of the zip code and phone number, the user's log-on code=DDHEE-EHJGGFJIAB This is merely one example of many combinations of user registration information and encryption or scrambling formulas to arrive at a user log-on code.

Referring now to FIG. 13, an exemplary method of item code encryption will be described. In this embodiment, to encrypt a crime scene location CSL1, a formula of $fn=(x+z)$ is applied, in which n=the numer or letter position, x=the alphanumeric position, and z=predetermined numbers (which in this embodiment are different than the predetermined numbers in the embodiment of FIG. 12), as well as an association of letters to numbers, which in this embodiments is the same as in the embodiment of FIG. 12, namely, A=0; B=2; C=3; D=4; E=5; F=6; G=7; . . . ; Z=36.

In this case, the encrypted code for CSL1 is determined as follows. The first letter, $f1=(x+1)=(C+1)=4=D$. The second letter, $f2=(x+2)=(S+2)=30=U$. The third letter, $f3=(x+4)=(L+4)=11=K$. The fourth letter, $f4=(x+3)=(1+3)=4=D$. Thus, the encrypted item code for crime scene location 1 (CSL1)=DUKD.

Figure 14:
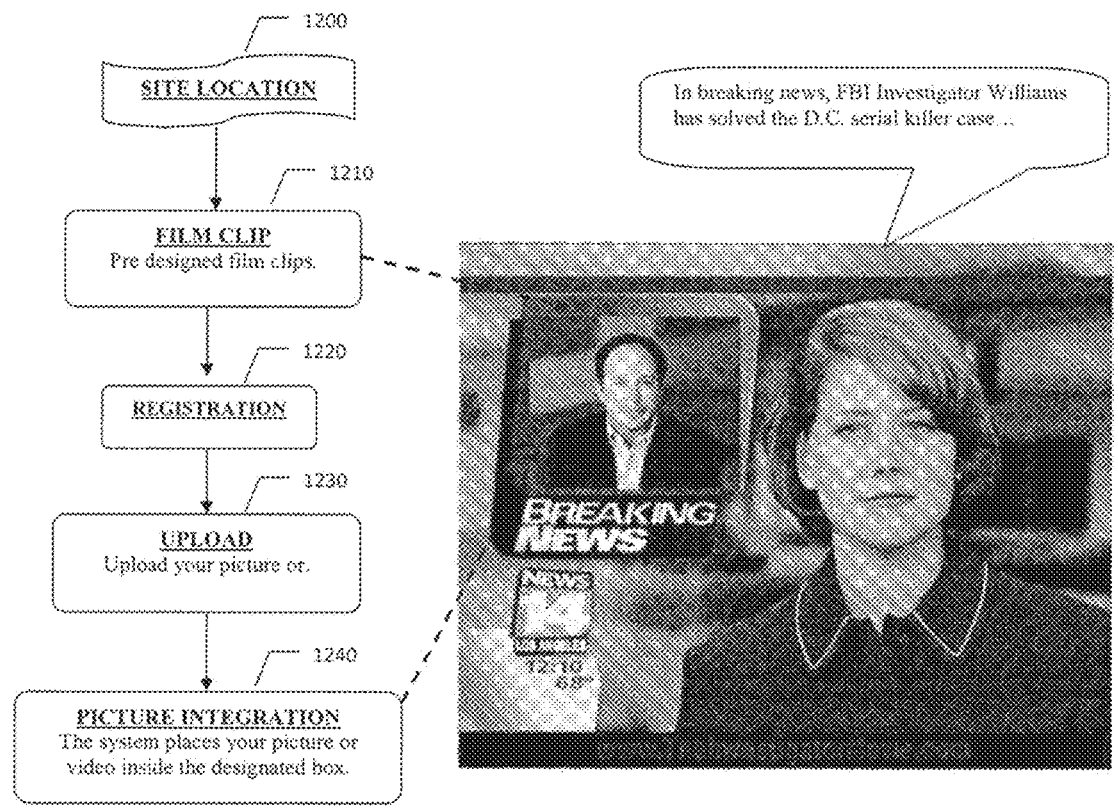
FIG. 14 is a flow diagram and exemplary image illustrating an integration of user media into a prestored media, according to an exemplary embodiment.

Referring now to FIG. 14, an exemplary method and image showing an integration of a user image with a prestored image is shown. The prestored image comprises a predetermined site location 1401. A predesigned film clip is a video of a local news reporter reporting a breaking news story that an FBI investigator has solved a murder. The audio of the video may further be integrated with textual data to identify the victim and the user, or other inputs in the video presentation, to add further realism. For example, a text-to-speech engine may be used to convert predetermined text (e.g., during user registration, during the build of the game, etc.) to audible sounds. At step 1402, a predesigned film clip is selected by a user. The user registers with personal information as needed at step 1403. At step 1404, the system is configured to receive an image and/or other data from the user for integration with the film clip. At step 1405, the system is configured to integrate the picture and/or text with the film clip inside the designated box in this embodiment.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments. Further steps from any of the embodiments described herein may be combined with any other steps to provide additional embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using existing computer processors, or by a special purpose computer processor for an appropriate system, incorporated for this or another purpose or by a hardwired system.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were shown and described in order to explain the principals of the invention and its practical application to enable one skilled in the art to utilize the invention in various embodiments and with various modifications as are suited to the particular use contemplated.

What is claimed is:

1. A system for providing an objective to a user in an online game, comprising:
   a user registration unit configured to receive a user request to operate the system;
   a build unit configured to build a unique game scenario for each user by selecting at least one branded variable component for use in the online game, wherein the build unit is further configured to generate a unique game code, the unique game code related to the unique game scenario, and wherein the unique game code is associated with specific data needed to recreate the unique game scenario;
   a user interface unit configured to receive user requests to interact with the at least one branded variable component and to provide information to the user in response to a user request;
   a user log unit configured to log user interactions with the at least one branded variable component; and
   an objective determination unit configured to determine whether the user has achieved the objective based at least in part on a user interaction with the at least one branded variable component.

2. The system of claim 1, wherein the at least one of the branded variable component includes at least one of pre-recorded video, branded static and dynamic items, interactive branding, or digital photograph to provide a more realistic user experience and advertising value.

3. The system of claim 1, wherein the objective determination unit is further configured to:
   retrieve time periods associated with the user interaction with the at least one branded variable component; and
   determine whether the user has achieved the objective based at least in part on the time periods.

4. The system of claim 1, wherein the build unit is further configured to generate different unique game scenarios for the user by altering information or content of the online game.

5. The system of claim 1, wherein the objective relates to at least one of a criminal investigation, a treasure hunt, a military training, or user education.

6. A method for providing an objective to a user in an online game, comprising:
   receiving, by a computing device, a user request to interact with the online game;
   building, by the computing device, a unique game scenario for each user by selecting at least one branded variable component for use in the online game;
   generating, by the computing device, a unique game code, the unique game code related to the unique game scenario, and wherein the unique game code is associated with specific data needed to recreate the unique game scenario;
   receiving, by the computing device, user requests to interact with the at least one branded variable component and to provide information to the user in response to a user request;
   logging user interactions with the at least one branded variable component; and
   determining, by the computing device, whether the user has achieved the objective based at least in part on a user interaction with the at least one branded variable component.

7. The method of claim 6, wherein the at least one of the branded variable component includes at least one of pre-recorded video, branded static and dynamic items, interactive brand, or digital photograph to provide a more realistic user experience and advertising value.

8. The method of claim 6, further comprising:
   retrieving, by the computing device, time periods associated with the user interaction with the at least one branded variable component; and
   determining, by the computing device, whether the user has achieved the objective based at least in part on the time periods.

9. The method of claim 6, further comprising:
   generating, by the computing device, different unique game scenarios for the user by altering information or content of the online game.

10. The method of claim 6, wherein the objective relates to at least one of a criminal investigation, a treasure hunt, a military training, or user education.

11. The method of claim 6, wherein the unique game scenario prevents user cheating by preventing sharing of information with another user, and wherein the unique game scenario creates unique games of skill.

12. A non-transitory computer readable medium comprising instructions which when executed by a processing system having at least one processing core, implements a method for providing an objective to a user in an online game, the method comprising:
   receiving a user request to interact with the online game;
   building a unique game scenario for each user by selecting at least one branded variable component for use in the online game;
   generating a unique game code, the unique game code related to the unique game scenario, and wherein the unique game code is associated with specific data needed to recreate the unique game scenario;
   receiving user requests to interact with the at least one branded variable component and to provide information to the user in response to a user request;
   logging user interactions with the at least one branded variable component; and
   determining whether the user has achieved the objective based at least in part on a user interaction with the at least one branded variable component;
   wherein the method is performed by the processing system of a computing device.

13. The non-transitory computer readable medium of claim 12, wherein the at least one of the branded variable component includes at least one of pre-recorded video, branded dynamic or static items, interactive brand, or digital photograph to provide a more realistic user experience and advertising value.

14. The non-transitory computer readable medium of claim 12, further comprising:
   retrieving time periods associated with the user interaction with the at least one branded variable component; and determining, whether the user has achieved the objective based at least in part on the time periods.

15. The non-transitory computer readable medium of claim 12, further comprising:
generating different unique game scenarios for the user by altering information or content of the online game.

16. The non-transitory computer readable medium of claim 12, wherein the objective relates to at least one of a criminal investigation, a treasure hunt, a military training, or user education.

17. The non-transitory computer readable medium of claim 12, wherein the user receives information or content not received during a previously generated scenario, the previously generated scenario generated for the user in a previous session of the online game.

* * * * *